US012656851B2

(12) United States Patent
Hu et al.

(10) Patent No.: US 12,656,851 B2
(45) Date of Patent: Jun. 16, 2026

(54) POWER CONSUMPTION ADJUSTMENT METHOD AND APPARATUS

(71) Applicant: Huawei Technologies Co., Ltd., Shenzhen (CN)

(72) Inventors: Di Hu, Beijing (CN); Xing Fu, Dongguan (CN); Dmytro Kutra, Kyiv (UA); Yurii Mariiash, Kyiv (UA); Zhen Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 18/425,734

(22) Filed: Jan. 29, 2024

(65) Prior Publication Data

US 2024/0168538 A1    May 23, 2024

Related U.S. Application Data

(63) Continuation of application No. PCT/CN2021/109893, filed on Jul. 30, 2021.

(51) Int. Cl.
| | |
|---|---|
| *G06F 1/3234* | (2019.01) |
| *G06F 1/28* | (2006.01) |
| *G06F 1/32* | (2019.01) |
| *G06F 1/3203* | (2019.01) |
| *G06F 1/3206* | (2019.01) |
| *G06F 1/324* | (2019.01) |
| *G06F 1/3296* | (2019.01) |
| *H04W 52/02* | (2009.01) |

(52) U.S. Cl.
CPC .............. *G06F 1/3243* (2013.01); *G06F 1/28* (2013.01); *G06F 1/324* (2013.01); *G06F 1/3296* (2013.01)

(58) Field of Classification Search
CPC .......... G06F 1/3243; G06F 1/28; G06F 1/324; G06F 1/3296
See application file for complete search history.

(56) References Cited

U.S. PATENT DOCUMENTS

| | | | |
|---|---|---|---|
| 2017/0371401 A1* | 12/2017 | Rotem | ................ G06F 9/30145 |
| 2019/0041971 A1 | 2/2019 | Ananthakrishnan et al. | |
| 2019/0171263 A1* | 6/2019 | Winkel | ................. G06F 1/3206 |
| 2020/0019230 A1* | 1/2020 | Rong | ...................... G06F 1/324 |

FOREIGN PATENT DOCUMENTS

| | | |
|---|---|---|
| WO | 2021120015 A1 | 6/2021 |

OTHER PUBLICATIONS

Mark Hachman, Intel's 'Ice Lake' 10th-gen Core CPUs boost graphics and Wi-Fi, tap AI to offset slower turbo speeds, PCword, May 27, 2019, total 21 pages.

* cited by examiner

*Primary Examiner* — Jaweed A Abbaszadeh
*Assistant Examiner* — Gayathri Sampath
(74) *Attorney, Agent, or Firm* — Slater Matsil, LLP

(57) ABSTRACT

A power consumption adjustment method includes: adjusting, based on state information of a processing unit, a time parameter corresponding to a power limit, determining power consumption of the processing unit based on an adjusted time parameter, and adjusting a frequency and a voltage of the processing unit based on the power consumption and the power limit of the processing unit. The time parameter corresponding to the power limit may be used to represent a time point at which an overclocking adjustment is performed on the processing unit.

20 Claims, 5 Drawing Sheets

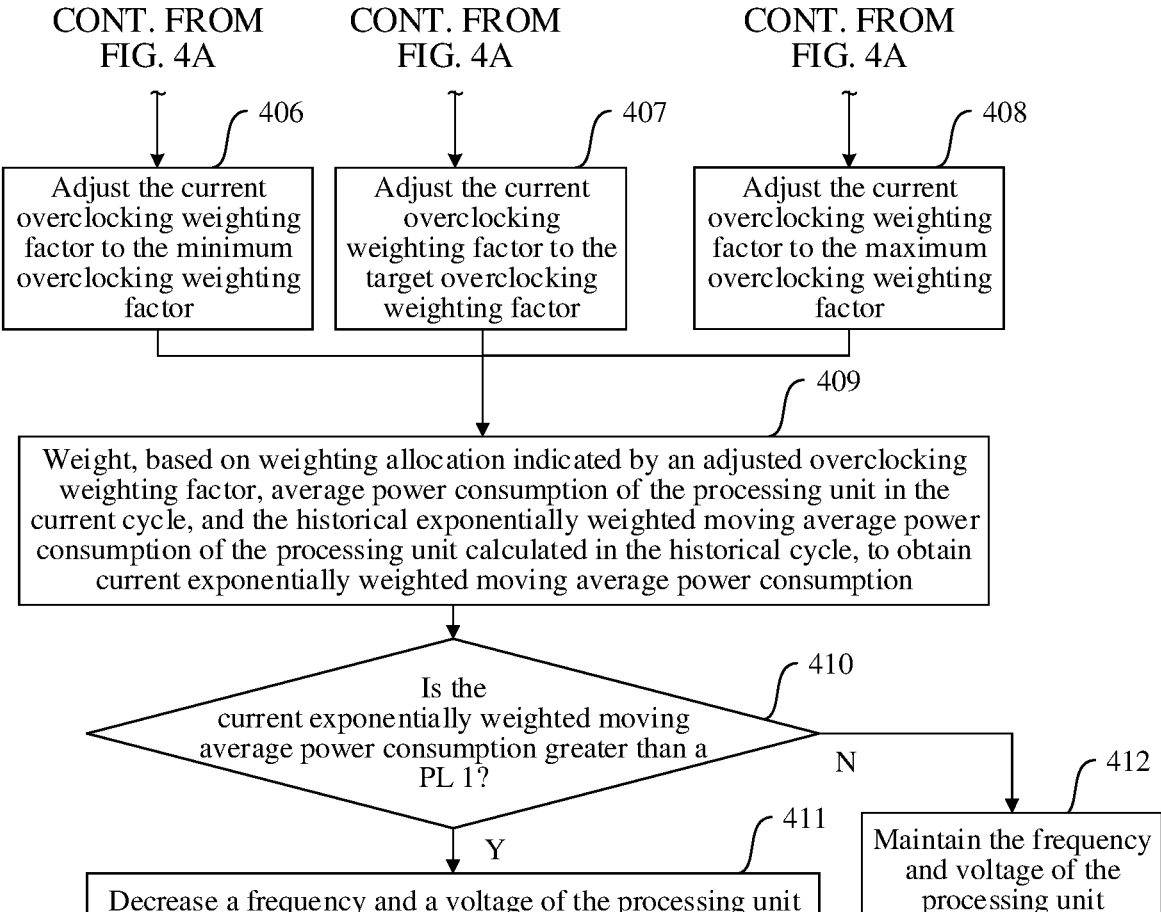

CONT. FROM
FIG. 4A

CONT. FROM
FIG. 4A

CONT. FROM
FIG. 4A

406

407

408

Adjust the current overclocking weighting factor to the minimum overclocking weighting factor Adjust the current overclocking weighting factor to the target overclocking weighting factor Adjust the current overclocking weighting factor to the maximum overclocking weighting factor

409

Weight, based on weighting allocation indicated by an adjusted overclocking weighting factor, average power consumption of the processing unit in the current cycle, and the historical exponentially weighted moving average power consumption of the processing unit calculated in the historical cycle, to obtain current exponentially weighted moving average power consumption

410

Is the current exponentially weighted moving average power consumption greater than a PL 1?

N

412

Y

411

Decrease a frequency and a voltage of the processing unit

Maintain the frequency and voltage of the processing unit

FIG. 4B

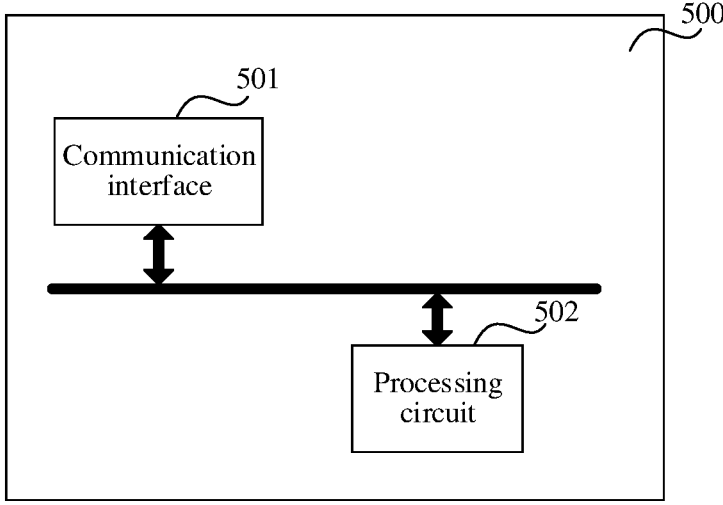

500

501

Communication interface

502

Processing circuit

FIG. 5

POWER CONSUMPTION ADJUSTMENT METHOD AND APPARATUS

CROSS-REFERENCE TO RELATED APPLICATIONS

This application is a continuation of International Application No. PCT/CN2021/109893, filed on Jul. 30, 2021, the disclosure of which is hereby incorporated by reference in its entirety.

TECHNICAL FIELD

This application relates to the field of processor technologies, and in particular, to a power consumption adjustment method and apparatus.

BACKGROUND

Currently, some standard operating parameters, such as an operating frequency and an operating voltage, are generally defined for a processor before delivery. In normal cases, the processor performs a processing operation based on the defined operating frequency. However, when the processor has an overclocking capability, if the defined operating frequency does not meet a demand of a current operating scenario of the processor, the frequency of the processor may be increased to a frequency higher than the defined operating frequency, so that the processor enters an overclocking state, to improve processing performance of the processor.

However, for the processor having the overclocking capability, duration in which the processor is in the overclocking state generally needs to be limited. Otherwise, if the processor is in a high-voltage and high-frequency operating state for a long time, a problem such as overheating or overcurrent may occur on a device in the processor. Therefore, how to flexibly limit the duration in which the processor is in the overclocking state becomes an urgent technical problem to be resolved currently.

SUMMARY

This application provides a power consumption adjustment method and apparatus, to flexibly limit duration in which a processor is in an overclocking state.

According to a first aspect, this application provides a power consumption adjustment method. The method is applicable to a power consumption regulator, and the method includes: The power consumption regulator adjusts, based on state information of a processing unit, a time parameter corresponding to a power limit, determines power consumption of the processing unit based on an adjusted time parameter, and adjusts a frequency and a voltage of the processing unit based on the power consumption and the power limit of the processing unit. In the foregoing design, the time parameter corresponding to the power limit may be used to represent a time point at which an overclocking adjustment is performed on the processing unit. The time parameter corresponding to the power limit is adjusted based on a state of the processing unit, so that not only the time point can be flexibly adjusted, but also the adjusted time point can match a current demand of the processing unit as much as possible. For example, when needing performance, the processing unit delays exiting overclocking, or when not needing performance, the processing unit exits overclocking in advance. This helps flexibly and accurately limit duration in which the processing unit is in an overclocking state. Further, the frequency and the voltage of the processing unit are adjusted by using the time parameter that matches the current demand, so that the adjusted frequency and the adjusted voltage can also match the current demand of the processing unit. This further helps improve accuracy of frequency modulation and voltage regulation.

In a possible design, the time parameter is an overclocking time parameter. That the power consumption regulator determines the power consumption of the processing unit based on an adjusted time parameter includes: The power consumption regulator weights current power consumption of the processing unit and historical power consumption of the processing unit based on weight allocation of the current power consumption of the processing unit and the historical power consumption of the processing unit that are indicated by the adjusted overclocking time parameter, to obtain first exponentially weighted moving average power consumption of the processing unit. In this design, a time point at which the processing unit enters or exits a PL 1 may be dynamically adjusted by adjusting an overclocking time parameter corresponding to the power limit PL 1.

In a possible design, the time parameter is a time cycle. That the power consumption regulator determines the power consumption of the processing unit based on an adjusted time parameter includes: The power consumption regulator determines average power consumption of the processing unit in the adjusted time cycle. In this design, a time cycle corresponding to any one of power limits PL 2 to PL 4 may be adjusted, so that the time point at which the processing unit enters or exits any one of the PL 2 to the PL 4 may be dynamically adjusted.

In a possible design, that the power consumption regulator adjusts, based on the state information of the processing unit, the time parameter corresponding to the power limit includes: The power consumption regulator adjusts the time parameter based on a power consumption fluctuation degree of the processing unit. A difference between the adjusted time parameter and the time parameter before the adjustment is in direct proportion to the power consumption fluctuation degree. In this design, the time parameter is adjusted based on a positive correlation relationship between the time parameter and the power consumption fluctuation degree, so that a time point that is indicated by the adjusted time parameter and at which the processing unit delays exiting overclocking or exits overclocking in advance can match an actual power consumption demand of the processing unit. This further improves overclocking performance.

In a possible design, before adjusting the time parameter based on the power consumption fluctuation degree of the processing unit, the power consumption regulator may further first determine first whether the power consumption fluctuation degree is greater than a preset fluctuation degree threshold. If yes, the time parameter may be adjusted based on the power consumption fluctuation degree of the processing unit. If no, it means that the power consumption changes, but the change is only a small fluctuation, and the fluctuation may even be ignored. In this way, the power consumption regulator may continue to maintain a current time parameter without consuming a resource to adjust the time parameter, to avoid that the time parameter is frequently adjusted in a scenario in which the power consumption frequently jitters. This further saves computing resources.

In a possible design, that the power consumption regulator adjusts the time parameter based on the power consumption fluctuation degree of the processing unit includes: The power consumption regulator obtains second exponentially weighted moving average power consumption of the processing unit under the time parameter before the adjustment. If the current power consumption of the processing unit is greater than the second exponentially weighted moving average power consumption, the power consumption regulator increases the time parameter; or if the current power consumption of the processing unit is less than the second exponentially weighted moving average power consumption, the power consumption regulator decreases the time parameter. In this design, the second exponentially weighted moving power consumption can be used to represent a historical power consumption demand of the processor. A change state of the power consumption demand of the processing unit is determined based on the second exponentially weighted moving power consumption, so that a decision result can better match an actual situation, and adjustment accuracy is effectively improved.

In a possible design, that the power consumption regulator increases or decreases the time parameter includes: The power consumption regulator calculates a power consumption variation of the current power consumption of the processing unit relative to the second exponentially weighted moving average power consumption, and uses, based on a preset positive correlation relationship between the power consumption variation and the time parameter, a time parameter corresponding to the calculated power consumption variation as a target time parameter. If the target time parameter is not less than a minimum time parameter and is not greater than a maximum time parameter, the power consumption regulator adjusts the time parameter to the target time parameter, so that when needing performance, the processing unit delays exiting overclocking, and when not needing the performance, the processing unit exits the overclocking in advance. This implements a dual effect of improving overclocking performance and reducing power consumption as much as possible. If the target time parameter is greater than the maximum time parameter, the power consumption regulator adjusts the time parameter to the maximum time parameter, so that the processing unit exits the overclocking state before the processing unit is about to exceed a safe temperature range. This improves overclocking processing performance while ensuring reliability of the processing unit. If the target time parameter is less than the minimum time parameter, the power consumption regulator adjusts the time parameter to the minimum time parameter, to reserve a period of time to complete transition from the overclocking state to a non-overclocking state. This improves stability of exiting the overclocking state.

In a possible design, that the power consumption regulator adjusts the frequency and the voltage of the processing unit based on the power consumption and the power limit of the processing unit includes: If the power consumption of the processing unit is greater than the power limit, the power consumption regulator decreases the frequency and the voltage of the processing unit, to avoid that the processing unit is in the overclocking state for a long time, and ensure that a temperature of the processing unit is within a controllable range. If the power consumption of the processing unit is not greater than the power limit, the frequency and the voltage of the processing unit are maintained, so that in a case in which the temperature of the processing unit is controllable, processing performance of the processing unit is maintained as much as possible.

According to a second aspect, this application provides a power consumption regulator, including a processing circuit and a communication interface. The processing circuit obtains state information of a processing unit through the communication interface, adjusts, based on the state information of the processing unit, a time parameter corresponding to a power limit, determines power consumption of the processing unit based on an adjusted time parameter, and adjusts a frequency and a voltage of the processing unit based on the power consumption and the power limit of the processing unit.

In a possible design, the time parameter is an overclocking time parameter. The processing circuit is specifically configured to weight current power consumption of the processing unit and historical power consumption of the processing unit based on weight allocation of the current power consumption of the processing unit and the historical power consumption of the processing unit that are indicated by the adjusted overclocking time parameter, to obtain first exponentially weighted moving average power consumption of the processing unit.

In a possible design, the time parameter is a time cycle, and the processing circuit is specifically configured to determine average power consumption of the processing unit in the adjusted time cycle.

In a possible design, the processing circuit may monitor a power consumption fluctuation degree of the processing unit through the communication interface, and adjust the time parameter based on the power consumption fluctuation degree of the processing unit. A difference between the adjusted time parameter and the time parameter before the adjustment is in direct proportion to the power consumption fluctuation degree.

In a possible design, before adjusting the time parameter based on the power consumption fluctuation degree of the processing unit, the processing circuit may further first determine that the power consumption fluctuation degree is greater than a preset fluctuation degree threshold.

In a possible design, the processing circuit is specifically configured to obtain second exponentially weighted moving average power consumption of the processing unit under the time parameter before the adjustment. If the current power consumption of the processing unit is greater than the second exponentially weighted moving average power consumption, the processing circuit increases the time parameter; or if the current power consumption of the processing unit is less than the second exponentially weighted moving average power consumption, the processing circuit decreases the time parameter.

In a possible design, the processing circuit is specifically configured to calculate a power consumption variation of the current power consumption of the processing unit relative to the second exponentially weighted moving average power consumption, and uses, based on a preset positive correlation relationship between the power consumption variation and the time parameter, a time parameter corresponding to the calculated power consumption variation as a target time parameter. If the target time parameter is not less than a minimum time parameter and is not greater than a maximum time parameter, the processing circuit adjusts the time parameter to the target time parameter. If the target time parameter is greater than the maximum time parameter, the processing circuit adjusts the time parameter to the maximum time parameter. If the target time parameter is less than the minimum time parameter, the processing circuit adjusts the time parameter to the minimum time parameter.

In a possible design, the processing circuit is specifically configured to decrease the frequency and the voltage of the processing unit by using the communication interface, if the power consumption of the processing unit is greater than the power limit, or maintain the frequency and the voltage of the processing unit if the power consumption of the processing unit is not greater than the power limit.

According to a third aspect, this application provides a power consumption regulator, including: an adjustment unit, configured to adjust, based on state information of a processing unit, a time parameter corresponding to a power limit; and a determining unit, configured to determine power consumption of the processing unit based on an adjusted time parameter, where the adjustment unit is further configured to adjust a frequency and a voltage of the processing unit based on the power consumption and the power limit of the processing unit.

In a possible design, the time parameter is an overclocking time parameter. The determining unit is specifically configured to weight current power consumption of the processing unit and historical power consumption of the processing unit based on weight allocation of the current power consumption of the processing unit and the historical power consumption of the processing unit that are indicated by the adjusted overclocking time parameter, to obtain first exponentially weighted moving average power consumption of the processing unit.

In a possible design, the time parameter is a time cycle, and the determining unit is specifically configured to determine average power consumption of the processing unit in the adjusted time cycle.

In a possible design, the adjustment unit is specifically configured to adjust the time parameter based on a power consumption fluctuation degree of the processing unit. A difference between the adjusted time parameter and the time parameter before the adjustment is in direct proportion to the power consumption fluctuation degree.

In a possible design, before the adjustment unit adjusts the time parameter based on the power consumption fluctuation degree of the processing unit, the determining unit may further first determine that the power consumption fluctuation degree is greater than a preset fluctuation degree threshold.

In a possible design, the adjustment unit is specifically configured to obtain second exponentially weighted moving average power consumption of the processing unit under the time parameter before the adjustment. If the current power consumption of the processing unit is greater than the second exponentially weighted moving average power consumption, the adjustment unit increases the time parameter; or if the current power consumption of the processing unit is less than the second exponentially weighted moving average power consumption, the adjustment unit decreases the time parameter.

In a possible design, the adjustment unit is specifically configured to calculate a power consumption variation of the current power consumption of the processing unit relative to the second exponentially weighted moving average power consumption, and uses, based on a preset positive correlation relationship between the power consumption variation and the time parameter, a time parameter corresponding to the calculated power consumption variation as a target time parameter. If the target time parameter is not less than a minimum time parameter and is not greater than a maximum time parameter, the adjustment unit adjusts the time parameter to the target time parameter. If the target time parameter is greater than the maximum time parameter, the adjustment unit adjusts the time parameter to the maximum time parameter. If the target time parameter is less than the minimum time parameter, the adjustment unit adjusts the time parameter to the minimum time parameter.

In a possible design, the adjustment unit is specifically configured to decrease the frequency and the voltage of the processing unit if the power consumption of the processing unit is greater than the power limit, or maintain the frequency and the voltage of the processing unit, if the power consumption of the processing unit is not greater than the power limit.

According to a fourth aspect, this application provides a processor, including a processing unit and a power consumption regulator connected to the processing unit. The power consumption regulator is configured to: adjust, based on state information of the processing unit, a time parameter corresponding to a power limit, determine power consumption of the processing unit based on an adjusted time parameter, and adjust a frequency and a voltage of the processing unit based on the power consumption and the power limit of the processing unit.

In a possible design, the processor further includes a power consumption sensor connected to the processing unit, and the power consumption sensor is further connected to the power consumption regulator. In a case in which the time parameter is an overclocking time parameter, the power consumption sensor may sense current power consumption of the processing unit, and send the current power consumption to the power consumption regulator. The power consumption regulator may weight the current power consumption of the processing unit and historical power consumption of the processing unit based on weight allocation of the current power consumption of the processing unit and the historical power consumption of the processing unit that are indicated by the adjusted overclocking time parameter, to obtain first exponentially weighted moving average power consumption of the processing unit.

In a possible design, the processor further includes a power consumption sensor connected to the processing unit, and the power consumption sensor is further connected to the power consumption regulator. In a case in which the time parameter is a time cycle, the power consumption sensor may sense power consumption of the processing unit in each instantaneous time segment and send the power consumption to the power consumption regulator. The power consumption regulator may determine, based on the power consumption of the processing unit in each instantaneous time segment, average power consumption of the processing unit in the adjusted time cycle.

In a possible design, the power consumption regulator is specifically configured to adjust the time parameter based on a power consumption fluctuation degree of the processing unit. A difference between the adjusted time parameter and the time parameter before the adjustment is in direct proportion to the power consumption fluctuation degree.

In a possible design, before adjusting the time parameter based on the power consumption fluctuation degree of the processing unit, the power consumption regulator may further first determine that the power consumption fluctuation degree is greater than a preset fluctuation degree threshold.

In a possible design, the power consumption regulator is specifically configured to obtain second exponentially weighted moving average power consumption of the processing unit under the time parameter before the adjustment. If the current power consumption of the processing unit is greater than the second exponentially weighted moving average power consumption, the power consumption regulator increases the time parameter; or if the current power consumption of the processing unit is less than the second exponentially weighted moving average power consumption, the power consumption regulator decreases the time parameter.

In a possible design, the power consumption regulator is specifically configured to calculate a power consumption variation of the current power consumption of the processing unit relative to the second exponentially weighted moving average power consumption, and uses, based on a preset positive correlation relationship between the power consumption variation and the time parameter, a time parameter corresponding to the calculated power consumption variation as a target time parameter. If the target time parameter is not less than a minimum time parameter and is not greater than a maximum time parameter, the power consumption regulator adjusts the time parameter to the target time parameter. If the target time parameter is greater than the maximum time parameter, the power consumption regulator adjusts the time parameter to the maximum time parameter. If the target time parameter is less than the minimum time parameter, the power consumption regulator adjusts the time parameter to the minimum time parameter.

In a possible design, the power consumption regulator is specifically configured to decrease the frequency and the voltage of the processing unit if the power consumption of the processing unit is greater than the power limit, or maintain the frequency and the voltage of the processing unit if the power consumption of the processing unit is not greater than the power limit.

In a possible design, the processor further includes a frequency modulation executor and a voltage regulation executor that are connected to the processing unit, and the frequency modulation executor and the voltage regulation executor are further connected to the power consumption regulator. The power consumption regulator may send, when the frequency and the voltage of the processing unit needs to be decreased, a frequency modulation instruction to the frequency modulation executor, and a voltage regulation instruction to the voltage regulation executor. The frequency modulation executor may decrease the frequency of the processing unit based on the frequency modulation instruction, and the voltage regulation executor may decrease the voltage of the processing unit based on the voltage regulation instruction.

According to a fifth aspect, this application provides an electronic device, including a processor. The processor is coupled to a memory, and the processor is configured to execute a computer program stored in the memory, so that the electronic device performs the method according to any one of the first aspect.

For beneficial effects corresponding to any one of the second aspect to the fifth aspect of this application, refer to the beneficial effects described in any one of the first aspect. Details are not described herein again.

BRIEF DESCRIPTION OF THE DRAWINGS

FIG. 4A and FIG. 4B are an example of a schematic flowchart of another power consumption adjustment method according to an embodiment of this application;

FIG. 5 is an example of a schematic structural diagram of a power consumption regulator according to an embodiment of this application.

DETAILED DESCRIPTION OF ILLUSTRATIVE EMBODIMENTS

Figure 1:
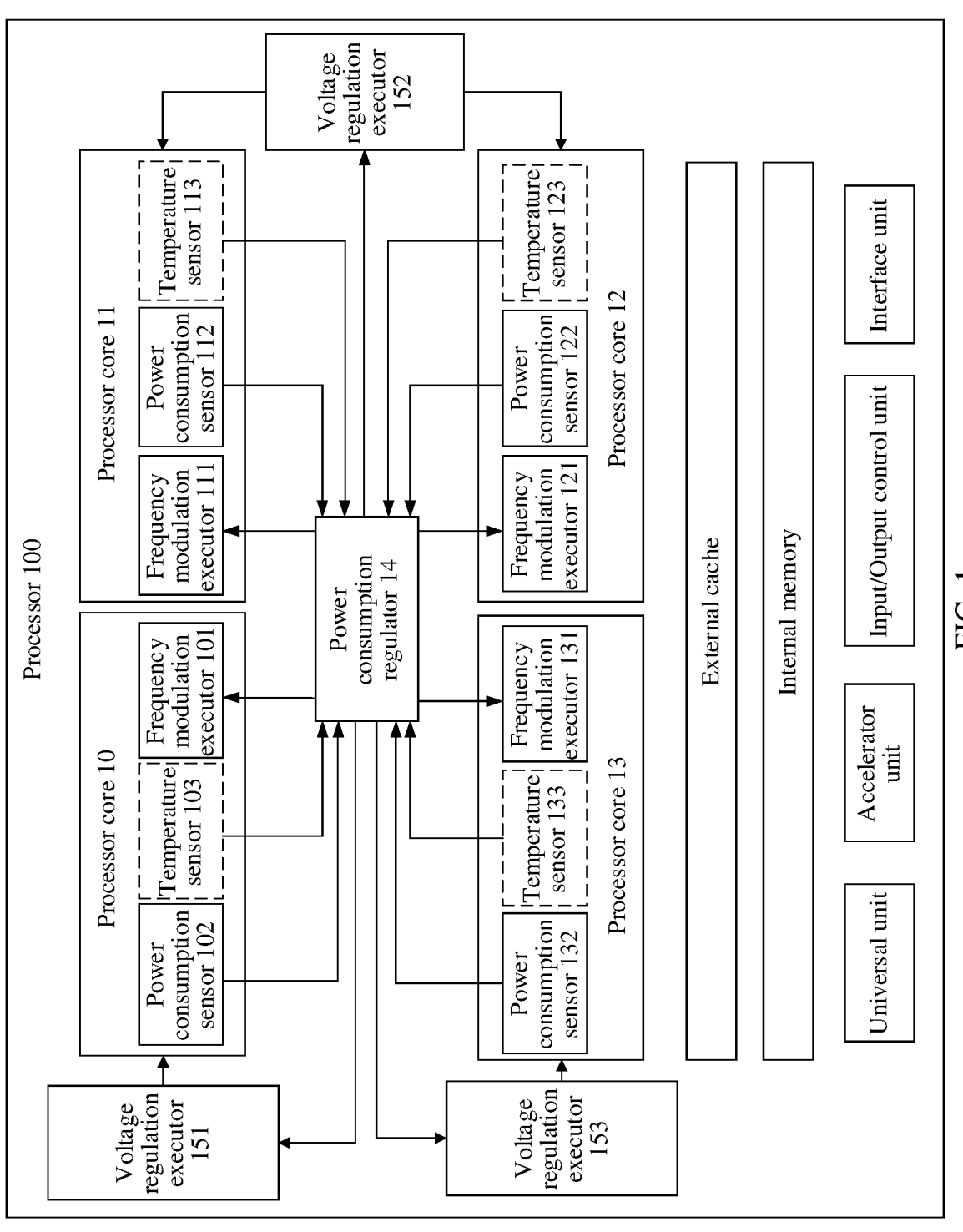
FIG. 1 is an example of a schematic structural diagram of a processor according to an embodiment of this application.

Power consumption adjustment solutions disclosed in this application may be applied to an electronic device having an overclocking function. In some embodiments of this application, a power consumption regulator may be an electronic device or an independent unit. When the power consumption regulator is the independent unit, the unit may be embedded in an electronic device, and can flexibly adjust, based on a state of a processor in the electronic device, a time point at which the processor enters or exits an overclocking state, to maximize utilization of power headroom of the processor while meeting a heat dissipation demand of the processor, and improve an overclocking capability of the processor. In some other embodiments of this application, the power consumption regulator may alternatively be a unit encapsulated inside a processor of an electronic device, and is configured to implement a frequency modulation and voltage regulation function of the processor. The electronic device may be a computer device having a processor, for example, a desktop computer, a personal computer, or a server. It should be further understood that the electronic device may alternatively be a portable electronic device having a processor, such as a mobile phone, a tablet computer, a wearable device (such as a smartwatch) having a wireless communication function, or a vehicle-mounted device. An example embodiment of the portable electronic device includes but is not limited to a portable electronic device using iOS®, Android®, Microsoft®, or another operating system. The portable electronic device may alternatively be, for example, a laptop computer with a touch-sensitive surface (for example, a touch panel).

When a processor in an electronic device has an overclocking function, if power consumption headroom of the processor meets an overclocking enabling condition, the processor may operate at a frequency higher than a frequency specified by a factory, to improve processing performance of the processor. However, for a processor having an overclocking function, if the processor is in an overclocking state only for a very short time, improvement of a processing capability of the processor may not be obvious. If the processor is in the overclocking state for a long time, a high-frequency and high-voltage operating mode may cause a temperature of the processor to continuously increase. When a heat dissipation capability of the processor cannot cool the processor in time, an excessively high temperature affects service life and reliability of the processor. Therefore, how to limit duration in which the processor is in the overclocking state to a proper time range is crucial to improving overclocking performance of the processor and maintaining the service life and the reliability of the processor.

To flexibly limit the duration in which the processor is in the overclocking state, the following four levels of power limit (PL) thresholds are set in advance in the industry based on rated power consumption of a processor or withstanding power consumption of the processor. A first level is a PL 1. The PL 1 is a power threshold that enables the processor to operate for a long time, and is generally set to a thermal design power (TDP) of the processor. The TDP represents lowest power consumption designed for heat dissipation of the processor. Provided that power of a heat sink of the processor is greater than the TDP, the heat sink can dissipate heat generated by the processor in time, and normal operation of the processor can be ensured. A second level is a PL 2. The PL 2 is a power threshold that enables the processor to operate beyond the TDP in a period of time, and is generally set to be 25% higher than the PL 1, that is, a 125% TDP. A third level is a PL 3. The PL 3 is a power threshold that enables the processor to operate beyond the PL 2 in a short time. A fourth level is a PL 4. The PL 4 is a power threshold that enables the processor to operate beyond the PL 3 in a very short time.

Further, if the duration in which the processor is in the overclocking state is not limited, heat generated by the processor may continuously increase, or even exceed heat that can be actually processed by the heat sink in the processor. As a result, a temperature of the processor continuously increases, and the processor is damaged. Based on this, time parameters that are in a one-to-one correspondence with the four levels of the power limits PL 1 to PL 4 are further set in the industry. Each time parameter corresponding to each level of the power limit in the four levels of the power limits PL 1 to PL 4 is a parameter used to limit duration in which the processor can persist within the power limit. The following separately describes each time parameter corresponding to each level of the power limit.

(1) A Time Parameter Corresponding to the PL 1

The time parameter corresponding to the PL 1 is an overclocking time parameter, which is also referred to as an overclocking weighting factor $\tau$, and is also referred to as TAU in some documents. When a power consumption limit threshold of the PL 1 is enabled in the processor, a power consumption regulator collects arithmetic average power consumption of the processor in each cycle based on preset cycle duration, and then weights, based on power consumption allocation indicated by an overclocking weighting factor $\tau$, the arithmetic average power consumption of the processor in a current cycle and historical exponentially weighted moving average power consumption calculated in a previous cycle, to obtain exponentially weighted moving average power consumption of the processor in the current cycle, to compare the obtained exponentially weighted moving average power consumption with the PL 1. If the calculated exponentially weighted moving average power consumption is greater than the PL 1, it means that the power consumption in the current cycle has exceeded a maximum power requirement specified by the PL 1. In this case, frequency reduction and voltage reduction may be performed on the processor, to limit the power consumption of the processor to be less than the PL 1. If the calculated exponentially weighted moving average power consumption is not greater than the PL 1, it means that the power consumption in the current cycle is still within a power range specified by the PL 1. In this case, a current frequency and a current voltage of the processor may continue to be maintained.

The exponentially weighted moving average power consumption of the processor in the current cycle may be calculated according to the following formula (1.1):

$$P_{EWNA1} = \frac{1}{\tau}P_1 + \left(1 - \frac{1}{\tau}\right)P_{EWMA0} \tag{1.1}$$

In the foregoing formula (1.1), $P_{EWMA_1}$ is the exponentially weighted moving average power consumption of the processor in the current cycle. $P_1$ is the arithmetic average power consumption of the processor in the current cycle, and may be generally obtained by performing arithmetic average on power consumption of the processor collected in each instantaneous time segment in the current cycle. $P_{EWMA_0}$ is the historical exponentially weighted moving average power consumption of the processor in the previous cycle of the current cycle, and may be obtained through calculation based on the arithmetic average power consumption of the processor in the previous cycle and historical exponentially weighted moving average power consumption of the processor calculated in a cycle before the previous cycle.

It can be learned from the foregoing formula (1.1) that the overclocking weighting factor $\tau$ actually indicates weight allocation of the arithmetic average power consumption of the processor in the current cycle and the historical exponentially weighted moving average power consumption of the processor. A larger value of the overclocking weighting factor $\tau$ indicates smaller weight corresponding to the arithmetic average power consumption in the current cycle and greater weight corresponding to the historical exponentially weighted moving average power consumption. In other words, an impact of the power consumption in the current cycle on a time point of actual frequency modulation and voltage regulation is smaller, and an impact of historical power consumption on the time point of the actual frequency modulation and voltage regulation is greater. Correspondingly, a smaller value of the overclocking weighting factor $\tau$ indicates greater weight corresponding to the arithmetic average power consumption in the current cycle and smaller weight corresponding to the historical exponentially weighted moving average power consumption. In other words, the impact of the power consumption in the current cycle on the time point of the actual frequency modulation and voltage regulation is greater, and the impact of the historical power consumption on the time point of the actual frequency modulation and voltage regulation is smaller.

(2) Time Parameters Corresponding to the PL 2 to the PL 4

The time parameters corresponding to the PL 2 to the PL 4 are referred to as time cycles T. For example, the PL 2 to the PL 4 respectively correspond to a time cycle T2 to T5. As a level of the power limits PL 2 to PL 4 increases, a corresponding time cycle becomes shorter accordingly. In other words, duration in which the processor is in the level of the power limit decreases as the level of the power limits increases, to reduce a probability that the processor is affected by a high temperature, and maintain service life and reliability of the processor as much as possible. When any one of the power consumption limit thresholds of the PL 2 to the PL 4 (assuming that the PL 3) is enabled, the power consumption regulator collects power consumption of the processor in each instantaneous time segment in each cycle based on a time cycle corresponding to the PL 3, calculates an arithmetic average value of the power consumption in each instantaneous time segment in a current cycle to obtain arithmetic average power consumption of the processor in the current cycle, and compares the calculated arithmetic average power consumption with the PL 3. If the calculated arithmetic average power consumption is greater than the PL 3, it means that the power consumption in the current cycle exceeds a maximum power requirement specified by the PL 3. In this case, frequency reduction and voltage reduction may be performed on the processor, to limit the power consumption of the processor to be less than the PL 3. If the calculated average power consumption is not greater than PL 3, it means that the power consumption in the current cycle is still within a power range specified by the PL 3. In this case, a current frequency and a current voltage of the processor may continue to be maintained.

Assuming that any one of the cycles is divided into n instantaneous time segments, the arithmetic average power consumption of the processor in the cycle may be obtained through calculation according to the following formula (1.2):

$$P_1 = \frac{\sum_{i=1}^{i=n} P_i}{n} \qquad (1.2)$$

In the foregoing formula (1.2), $P_1$ is the arithmetic average power consumption of the processor in the cycle, and $P_i$ is power consumption of the processor collected in an $i^{th}$ instantaneous time segment of the cycle.

It can be learned from the foregoing formula (1.2) that a time cycle T actually indicates duration between two adjacent frequency modulation and voltage regulation operations. A larger value of the time cycle T indicates longer duration between two adjacent frequency modulation and voltage regulation operations. After a frequency modulation and voltage regulation operation, the processor performs power consumption comparison for a next time after a long time, and determines, based on a comparison result, whether to perform frequency modulation and voltage regulation. Correspondingly, a smaller value of the time cycle T indicates shorter duration between two adjacent frequency modulation and voltage regulation operations. After a frequency modulation and voltage regulation operation, the processor performs power consumption comparison for a next time after a short time, and determines, based on a comparison result, whether to perform frequency modulation and voltage regulation.

Based on the foregoing levels of power limit thresholds and corresponding time parameters, some optional values of each time parameter are preset by the industry before delivery of a processor. In this way, after the delivery of the processor, when adjusting power consumption of the processor by using any one of the power limits, a user may select, based on an actual demand of the user, one of the optional values of the time parameters corresponding to the power limits that are preset in the processor, and configure the value to take effect, so that the processor controls, based on the configured effective value, duration in which the processor operates within a corresponding power limit. However, in this solution provided in the industry, provided that the user selects a time parameter, the processor keeps using the selected fixed time parameter to determine a time point for subsequent frequency modulation and voltage regulation. It is clear that, this adjustment manner is not flexible, and because a power consumption demand in an actual scenario may not be considered, the determined time point does not match the demand in the actual scenario. This is not conducive to improving overclocking performance of the processor.

In view of this, this application provides a power consumption adjustment method, to dynamically adjust a time parameter corresponding to a power limit, so that the adjusted time parameter meets a power consumption demand in an actual scenario as much as possible, to effectively improve overclocking performance of a processing unit.

The following describes the technical solutions in embodiments of the present invention with reference to the accompanying drawings in embodiments of the current invention. It is clear that the described embodiments are merely a part rather than all of embodiments of the present invention.

The terms "system" and "network" may be used interchangeably in embodiments of this application. "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be in a singular form or a plural form.

Unless otherwise specified, ordinal numbers such as "first" and "second" mentioned in embodiments of this application are used to distinguish a plurality of objects, but are not used to limit priorities or importance degrees of the plurality of objects. For example, first exponentially weighted moving average power consumption and second exponentially weighted moving average power consumption are merely used to distinguish different exponentially weighted moving average power consumption calculated by using power consumption in different time segments, but do not indicate different priorities or importance degrees of the two pieces of exponentially weighted moving average power consumption.

In addition, "connection" in embodiments of this application may be understood as an electrical connection, and a connection between two electrical elements may be a direct or indirect connection between the two electrical elements. For example, a connection between A and B may represent that A and B are directly connected to each other, or A and B are indirectly connected to each other through one or more other electrical elements. For example, the connection between A and B may alternatively represent that A and C are directly connected to each other, C and B are directly connected to each other, and A and B are connected to each other through C. In some scenarios, the "connection" may also be understood as coupling, for example, electromagnetic coupling between two inductors. In a word, A and B are connected, so that electric energy can be transmitted between A and B.

FIG. 1 is an example of a schematic structural diagram of a processor according to an embodiment of this application. As shown in FIG. 1, a processor 100 may include at least one processor core, for example, a processor core 10, a processor core 11, a processor core 12, and a processor core 13. The at least one processor core is used as a core component of the processor 100, and is configured to implement a processing function of the processor 100. The processor 100 may further include a non-core component, for example, a general-purpose unit (including a counter, a decoder, a signal generator, and the like), an accelerator unit, an input/output control unit, an interface unit, an internal memory, and an external cache. The processor core and the non-core component may be connected through a bus, to implement a data transmission operation.

It should be understood that the processor 100 may be an integrated circuit chip and has a signal processing capability. For example, the processor 100 may be a general-purpose processor, may be a field programmable gate array (FPGA), may be an application-specific integrated chip (ASIC), may be a system-on-a-chip (SoC), may be a network processor (NP), may be a digital signal processing (DSP) circuit, may be a microcontroller (MCU), may be a programmable controller, or may be another programmable logic device, discrete gate or transistor logic device, discrete hardware component, or another integrated chip. The processor 100 may include a central processing unit (CPU), a neural-network processing unit (NPU), and a graphics processing unit (GPU), and may further include an application processor (AP), a modem processor, an image signal processor (ISP), a video codec, a digital signal processor (DSP), a baseband processor, and/or the like. These components may be separately deployed on different chips, or may be integrated into one chip. This is not specifically limited.

It may be understood that the memory (for example, the internal memory and the external cache) in embodiments of this application may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory in the method described in this specification is intended to include but is not limited to these memories and any other memory of a proper type.

Figure 2:
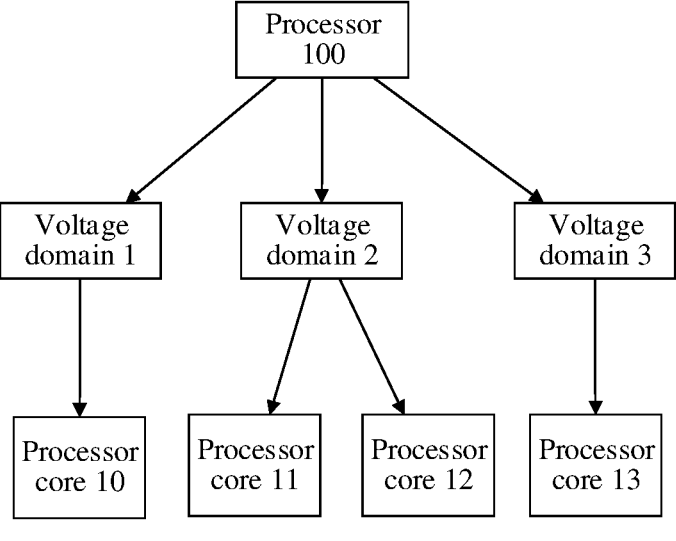
FIG. 2 is an example of a schematic diagram of a voltage domain division manner according to an embodiment of this application.

Still refer to FIG. 1. In embodiments of this application, all processor cores (for example, the processor core 10 to the processor core 13) in the processor 100 may be located in a same voltage domain, or may be located in different voltage domains, or some processor cores may be located in a same voltage domain. This is not specifically limited. The processor cores located in a same voltage domain may have a same operating voltage. For example, FIG. 2 is a schematic diagram of a voltage domain division manner according to an embodiment of this application. Assuming that there is a voltage domain 1, a voltage domain 2, and a voltage domain 3 in the processor 100, the processor core 10 is located in the voltage domain 1, the processor core 11 and the processor core 12 are located in the voltage domain 2, and the processor core 13 is located in the voltage domain 3. In this case, the processor core 10 and the processor core 13 may each have an independent operating voltage, and the processor core 11 and the processor core 12 may have a same operating voltage. In addition, the independent operating voltage of the processor core 10, the independent operating voltage of the processor core 13, and the same operating voltage of the processor core 11 and the processor core 12 may be the same or may be different. This is not limited. In addition, the processor cores in a same voltage domain may be of a same type. For example, both the processor core 11 and the processor core 12 may be CPU cores, or may be of different types. For example, the processor core 11 is a CPU core, and the processor core 12 is a GPU core. This is not specifically limited.

Still refer to FIG. 1. In embodiments of this application, the processor 100 may further include a power consumption regulator 14, a frequency modulation executor disposed in each processor core (for example, a frequency modulation executor 101 disposed in the processor core 10, a frequency modulation executor 111 disposed in the processor core 11, a frequency modulation executor 121 disposed in the processor core 12, and a frequency modulation executor 131 disposed in the processor core 13), and a voltage regulation executor disposed in each voltage domain (for example, as shown in FIG. 1, a voltage regulation executor 151 disposed in the voltage domain 1, a voltage regulation executor 152 disposed in the voltage domain 2, and a voltage regulation executor 153 disposed in the voltage domain 3). The voltage regulation executor disposed in each voltage domain may be connected to each processor core included in the voltage domain, for example, the voltage regulation executor 152 disposed in the voltage domain 2 is connected to both the processor core 11 and the processor core 12 included in the voltage domain 2. The power consumption regulator 14 may be connected to the frequency modulation executor in each processor core and the voltage regulation executor in each voltage domain. In this way, when frequency modulation and voltage regulation need to be performed on a processor core, the power consumption regulator 14 may send a frequency modulation instruction to a frequency modulation executor in the processor core, to instruct the frequency modulation executor to adjust an operating frequency of the processor core based on the frequency modulation instruction, and send a voltage regulation instruction to a voltage regulation executor in a voltage domain in which the processor core is located, to instruct the voltage regulation executor to adjust an operating voltage of each processor core in the voltage domain based on the voltage regulation instruction.

It should be understood that FIG. 1 is merely an example for description. In another possible example, in each voltage domain, a frequency modulation executor shared by all processor cores in the voltage domain may be disposed. In this case, the power consumption regulator 14 may perform adjustment on a frequency of a voltage domain in which a frequency modulation executor is located, to implement uniform adjustment on frequencies of all processor cores in the voltage domain. Alternatively, a frequency modulation executor may be disposed only in one or more processor cores or only in one or more voltage domains. In this case, the power consumption regulator 14 may perform frequency modulation only on the processor core or the voltage domain in which the frequency modulation executor is disposed. Alternatively, a frequency modulation executor and a voltage regulation executor may be disposed in a non-core component. In this case, the power consumption regulator 14 may not only adjust a frequency and a voltage of a processor core, but also adjust a frequency and a voltage of the non-core component. Certainly, the non-core component described herein refers to a component that operates at a specified frequency. In addition, FIG. 1 is merely described by using an example in which a frequency modulation function and a voltage regulation function are separately implemented on different devices. In an actual operation, the frequency modulation function and the voltage regulation function may alternatively be implemented on a same device. This is not specifically limited in this application.

Based on a processor architecture shown in FIG. 1, the following describes specific implementation of the power consumption adjustment method in this application through specific embodiments. It should be noted that the following processing unit may be a processor core, a voltage domain, or an entire processor. This is not specifically limited in this application.

Embodiment 1

Figure 3:
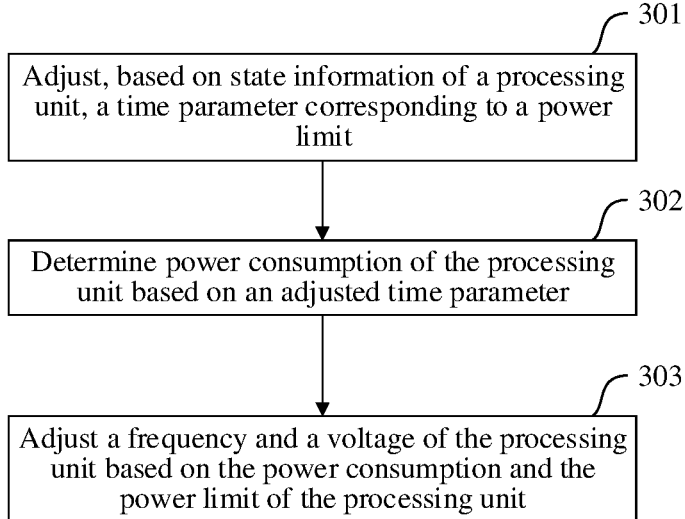
FIG. 3 is an example of a schematic flowchart of a power consumption adjustment method according to an embodiment of this application.

FIG. 3 is an example of a schematic flowchart of a power consumption adjustment method according to an embodiment of this application. The method is applicable to a power consumption regulator, for example, the power consumption regulator 14 shown in FIG. 1. In this embodiment, the power consumption regulator may execute the following power consumption adjustment method in a cyclical manner. FIG. 3 illustrates an example of a power consumption adjustment process of the power consumption regulator. As shown in FIG. 3, the method includes the following steps.

Step 301: The power consumption regulator adjusts, based on state information of a processing unit, a time parameter corresponding to a power limit.

In step 301, the time parameter corresponding to the power consumption limit may include the overclocking weighting factor $\tau$ corresponding to the PL 1, or may include a time cycle T corresponding to any one of the PL 2 to the PL 4, or may include a time parameter corresponding to another power limit that currently exists or may occur in the future, for example, an overclocking weighting factor or a time cycle corresponding to a PL 5 or even a PL 6 that may occur in the future, or may further include modified time parameters obtained by modifying the time parameters corresponding to the PL 1 to the PL 4.

The following describes two design solutions by which a time parameter can be adjusted.

In a possible design, a fifth-level power limit PL 5 and a corresponding time cycle T5 may be additionally set (certainly, a higher-level power limit and a corresponding time cycle may be simultaneously set, and this is not specifically limited). The PL 5 is a power threshold that enables a processor can operate beyond the PL 4 in a short time, and the time cycle T5 corresponding to the PL 5 is less than a time cycle T4 corresponding to the PL 4. In this way, in addition to adjusting the time parameter corresponding to any one of the PL 1 to the PL 4 based on the state information of the processing unit, the power consumption regulator may further adjust, based on the state information of the processing unit, the time cycle T5 corresponding to the PL5 that is additionally set, to dynamically adjust duration in which the processing unit is in an ultra-high frequency operating mode while providing the ultra-high frequency operating mode for the processing unit.

In another possible design, the third-level power limit PL 3 is used as an example. A corresponding overclocking weighting factor $\tau_3$ may be further added to a time cycle T3 corresponding to the PL 3. In other words, after arithmetic average power consumption in each time cycle T3 is collected, the arithmetic average power consumption and historical exponentially weighted moving average power consumption calculated in a previous T3 cycle are weighted based on weight allocation indicated by the corresponding overclocking weighting factor $\tau_3$, to obtain exponentially weighted moving average power consumption in the time cycle T3, and then whether to adjust a frequency and a voltage is determined based on a comparison result between the exponentially weighted moving average power consumption and the PL 3. In this design, in addition to adjusting the time cycle T3 corresponding to the PL 3 based on the state information of the processing unit, the power consumption regulator may also synchronously adjust an overclocking weighting factor $\tau_3$ additionally set for the PL 3, to further refine a power consumption adjustment process at the PL 3 level through joint adjustment of two time parameters.

It should be understood that there are still many design solutions in which the time parameter can be adjusted, and the design solutions are not listed one by one in this application.

For example, in step 301, the state information of the processing unit used to adjust the time parameter may include but is not limited to power consumption information of the processing unit, temperature information of the processing unit, and load information of the processing unit. The power consumption information of the processing unit may be cyclically monitored and reported to the power consumption regulator by a power consumption sensor disposed in the processing unit. For example, when the processing unit is a processor core, as shown in FIG. 1, a power consumption sensor may be disposed in each processor core. For example, a power consumption sensor 102 is disposed in the processor core 10, a power consumption sensor 112 is disposed in the processor core 11, a power consumption sensor 122 is disposed in the processor core 12, and a power consumption sensor 132 is disposed in the processor core 13. Certainly, a shared power consumption sensor may alternatively be disposed in a plurality of processor cores. In this case, because the shared power consumption sensor senses total power consumption of a plurality of processing units, the power consumption regulator may further perform arithmetic average on the total power consumption reported by the power consumption sensor, to obtain arithmetic average power consumption of one processor core. Correspondingly, the temperature information of the processing unit may be cyclically monitored and reported to the power consumption regulator by a temperature sensor disposed in the processing unit. For example, when the processing unit is the processor core, as shown in FIG. 1, a temperature sensor may be disposed in each processor core. For example, a temperature sensor 103 is disposed in the processor core 10, a temperature sensor 113 is disposed in the processor core 11, a temperature sensor 123 is disposed in the processor core 12, and a temperature sensor 133 is disposed in the processor core 13. Certainly, a shared temperature sensor may alternatively be disposed in the plurality of processor cores. In this case, because the shared temperature sensor senses an instantaneous temperature at a specified position, the power consumption regulator may further perform deviation compensation on the instantaneous temperature reported by the temperature sensor, to obtain an instantaneous temperature of a processor core. In addition, the load information of the processing unit may be obtained by converting the power consumption or the temperature reported by the power consumption sensor and/or the temperature sensor, or may be obtained through calculation by monitoring a quantity of times of inter-process communication (inter-process communication, IPC) performed by the processing unit in one cycle, and multiplying the quantity by preset load corresponding to each IPC operation. This is not specifically limited.

Further, for example, in the foregoing step 301, there are many manners of adjusting the time parameter based on the state information of the processing unit. Examples are as follows.

In an adjustment manner in which only a single factor is considered, assuming that the single factor is a temperature, the power consumption regulator may determine, based on a current temperature of the processing unit in a current cycle reported by the temperature sensor and a historical temperature reported by the temperature sensor in a historical cycle before the current cycle, whether the temperature of the processing unit in the current cycle increases or decreases relative to the temperature in the historical cycle. When the temperature increases, it means that the processing unit has a higher demand for performance, and the processing unit currently needs more performance. In this case, the power consumption regulator may adjust the time parameter to delay exiting an overclocking state, so that the processing unit keeps in the overclocking state as much as possible when the processing unit needs the performance. This effectively improving an overclocking capability of the processing unit. Conversely, when the temperature decreases, it means that the processing unit has a lower demand for performance, and the processing unit currently may not need the performance. In this case, the power consumption regulator may adjust the time parameter to exit the overclocking state in advance, to save more power budget for a next overclocking operation.

Further, for example, in a case in which the temperature increases, a higher temperature indicates that the processing unit has a higher demand for performance. In this case, the power consumption regulator may further adjust the time parameter to enable the processing unit to exit the overclocking state later. In other words, although the processing unit can exit the overclocking state later when the temperature increases, the more the temperature increases, the later the processing unit exits the overclocking state, and the less the temperature increases, the earlier the processing unit exits the overclocking state. Conversely, when the temperature decreases, a lower temperature means that the processing unit has a lower demand for performance. In this case, the power consumption regulator may further adjust the time parameter to enable the processing unit to exit the overclocking state earlier. In other words, although the processing unit can exit the overclocking state in advance when the temperature decreases, the more the temperature decreases, the earlier the processing unit exits the overclocking state, and the less the temperature decreases, the later the processing unit exits the overclocking state. In this way, in this example, the time parameter is adjusted based on a positive correlation relationship between the time parameter and a temperature variation, and duration that is of delaying exiting the overclocking state or duration that is of exiting the overclocking state in advance and that is indicated by the adjusted time parameter can further match an actual power consumption demand of the processing unit. This further improves overclocking performance.

Further, for example, before adjusting the time parameter, the power consumption regulator may further determine whether an absolute value of a temperature increase amount or an absolute value of a temperature decrease amount is greater than a preset temperature threshold. If the absolute value is not greater than the preset temperature threshold, it means that although the temperature changes, the change is only a small fluctuation, and the fluctuation may even be ignored. In this case, it may be considered that performance currently demanded by the processing unit is basically the same as a historical performance demand, and the power consumption regulator may continue to maintain a current time parameter without consuming a resource to adjust the time parameter, to avoid that the time parameter is frequently adjusted in a scenario in which the power consumption frequently jitters, and save computing resources. Conversely, if the absolute value is greater than the preset temperature threshold, it means that a phenomenon that the temperature increases sharply or the temperature decreases sharply occurs in the processing unit, and a current performance demand of the processing unit has indeed changed. In this case, the power consumption regulator may adjust the time parameter in the foregoing manner.

It should be noted that there is a positive correlation relationship among three factors: load, power consumption, and temperature. When the load increases, the processing unit performs more operations, and the power consumption increases accordingly. The increased power consumption is reflected in a form of temperature, and consequently the temperature of the processing unit increases. When the load decreases, the processing unit performs fewer operations, the power consumption also decreases accordingly, and consequently the temperature of the processing unit decreases. In this way, based on the positive correlation relationship among the load, the power consumption, and the temperature, a specific implementation of adjusting the time parameter based on the power consumption or the load may be directly implemented according to the foregoing manner of adjusting the time parameter based on the temperature. For example, the temperature in the foregoing content may be directly replaced with the power consumption or the load. Details are not described in this application again.

In an adjustment manner in which at least two factors are considered, assuming that three factors, namely, temperature, power consumption, and load, are simultaneously considered, the power consumption regulator may further simultaneously obtain a temperature variation, a power consumption variation, and a load variation of the processing unit in a current cycle relative to a historical cycle, and calculate a weighted average variation of the three variations (where weights of the three factors may be set based on impact proportions of the temperature, the power consumption, and the load in an actual scenario that is determined in an experiment, or may be set by a person skilled in the art based on experience, for example, may be set to a same weight, or may be set to different weights, and this is not specifically limited). When the weighted average variation is positive and is greater than a preset weighting threshold, it indicates that the processing unit currently is very much in need of performance. The power consumption regulator may adjust the time parameter to delay exiting the overclocking state, and may further determine an amplitude of adjusting the time parameter based on a positive correlation relationship between duration of delaying exit and the weighted average variation, so that the adjusted time parameter matches a current actual power consumption demand. Conversely, when the weighted average variation is negative and an absolute value is greater than the preset weighting threshold, it indicates that the processing unit does not need performance at the current moment. The power consumption regulator may adjust the time parameter to exit the overclocking state in advance, and may further determine the amplitude of adjusting the time parameter based on a positive correlation relationship between duration of exiting in advance and the absolute value of the weighted average variation. When the weighted average variation is positive and not greater than the preset weighting threshold, or the weighted average variation is negative and the absolute value is not greater than the preset weighting threshold, it indicates that a current performance demand of the processing unit remains unchanged, and the power consumption regulator may continue to maintain a current time parameter. In this adjustment manner, the time parameter is adjusted comprehensively based on the three factors, so that more comprehensive and more detailed adjustment can be implemented, an accidental phenomenon occurring in the adjustment based on a single factor is avoided, and accuracy of adjusting the time parameter is effectively improved.

It should be noted that for how to adjust the time parameter to delay exiting the overclocking state and how to adjust the time parameter to exit the overclocking state in advance in the foregoing content, refer to the following Embodiment 2, and this is not specifically described herein. In addition, the foregoing time parameter adjustment policy is generally executed together with a temperature adjustment policy. To be specific, even if the temperature, the power consumption, and the load suddenly increase, due to support of the temperature adjustment policy, the increased temperature, the increased power consumption, and the increased load still do not enable the temperature to increase to a temperature limit set in a temperature policy. In this way, in the foregoing adjustment manner, within a safe temperature range, overclocking duration of a processing unit that needs performance can be prolonged, and overclocking duration of a processing unit that does not need performance can be shortened. This helps implement a dual effect of improving overclocking performance and reducing power consumption.

Step 302: The power consumption regulator determines power consumption of the processing unit based on an adjusted time parameter.

In step 302, the power consumption of the processing unit may include but is not limited to: exponentially weighted moving average power consumption corresponding to the PL 1, arithmetic average power consumption corresponding to any one of the PL 2 to the PL 4, exponentially weighted moving average power consumption or arithmetic average power consumption corresponding to a PL that is additionally set, exponentially weighted moving average power consumption corresponding to the PL 2 to the PL 4 with an overclocking weighting factor added, and arithmetic average power consumption corresponding to the PL 1 whose overclocking weighting factor is changed to a time cycle. For example, in a case in which a PL 5 and a corresponding time cycle T5 are additionally set according to the manner in step 301, the power consumption regulator may use the arithmetic average power consumption in each time cycle T5 as the power consumption of the processing unit according to the foregoing formula (1.2). For another example, in a case in which a corresponding overclocking weighting factor $\tau_3$ is added to a time cycle T3 corresponding to the PL 3 according to the manner in step 301, refer to the foregoing formula (1.1), the power consumption regulator may use weight allocation indicated by the overclocking weighting factor $\tau_3$ to weight arithmetic average power consumption of the processing unit in each time cycle T3 and historical exponentially weighted moving average power consumption of the processing unit calculated in a previous cycle of each time cycle T3, and uses exponentially weighted moving average power consumption obtained through weighting as the power consumption of the processing unit.

It should be understood that when the exponentially weighted moving average power consumption calculated according to the foregoing formula (1.1) is used as the power consumption of the processing unit, or the arithmetic average power consumption calculated according to the foregoing formula (1.2) is used as the power consumption of the processing unit, the power consumption of the processing unit is actually represented from the perspective of average power consumption, and this is only an optional implementation. In another optional implementation, a time unit greater than or less than an instantaneous time segment may be used to represent the power consumption of the processing unit. For example, total power consumption in a cycle is used as the power consumption of the processing unit, and whether frequency modulation and voltage regulation are required is determined based on the total power consumption in the cycle. This is not specifically limited.

Step 303: The power consumption regulator adjusts a frequency and a voltage of the processing unit based on the power consumption and the power limit of the processing unit.

For example, still refer to FIG. 1. Assuming that the processing unit is the processor core 11 and the PL 1 is enabled in the processor core 11, after determining exponentially weighted moving average power consumption of the processor core 11 based on adjusted $\tau$, if the exponentially weighted moving average power consumption is greater than the PL 1, the power consumption regulator may send a frequency modulation instruction to a frequency modulation execution unit 111 connected to the processor core 11, to instruct the frequency modulation execution unit 111 to decrease an operating frequency of the processor core 11, and send a voltage regulation instruction to a voltage regulation execution unit 152 connected to the processor core 11, to instruct the voltage regulation execution unit 152 to decrease an operating voltage of the processor core 11. If the exponentially weighted moving average power consumption is less than the PL 1, the power consumption regulator may not need to send the frequency modulation instruction and the voltage regulation instruction, and continue to maintain a current operating frequency and a current operating voltage of the processor core 11.

Further, for example, when it is determined that the frequency and the voltage of the processor core 11 need to be decreased, the power consumption regulator 14 may determine a target frequency and a target voltage based on a preset positive correlation relationship between a frequency and a voltage, send a frequency modulation instruction carrying the target frequency to the frequency modulation execution unit 111, and send a voltage regulation instruction carrying the target voltage to the voltage regulation execution unit 152. After receiving the frequency modulation instruction and the frequency modulation voltage respectively, the frequency modulation execution unit 111 and the voltage regulation execution unit 152 may directly adjust the operating frequency and the operating voltage of the processor core 11 to the target frequency in the frequency modulation instruction and the target voltage in the voltage regulation instruction through one adjustment, to improve efficiency of frequency modulation and voltage regulation, or may slowly adjust for many times the operating frequency and the operating voltage of the processor core 11 to the target frequency in the frequency modulation instruction and the target voltage in the voltage regulation instruction in a manner of step-by-step adjustment or continuous adjustment, to improve stability of the frequency modulation and voltage regulation. The preset positive correlation relationship between the frequency and the voltage may be pre-packaged inside the power consumption regulator by a worker before the processor is delivered. Positive correlation relationships corresponding to processor cores may be the same or may be different. This is not specifically limited. Certainly, this is only a possible implementation. In another possible implementation, the frequency modulation instruction and the voltage regulation instruction may alternatively include a decrease trend but do not include the target frequency and the target voltage. The frequency modulation execution unit 111 and the voltage regulation execution unit 152 may decrease the frequency and the voltage of the processor core 11 based on the decrease trend in the frequency modulation instruction and the voltage regulation instruction, and a specific decrease amount may be determined by the frequency modulation execution unit 111 and the voltage regulation execution unit 152.

Further, for example, considering that processor cores located in a same voltage domain generally need to have a same operating voltage, after determining a target voltage of a processor core, the power consumption regulator 14 may further compare target voltages of processor cores in a voltage domain in which the processor core is located, select a maximum target voltage as a final target voltage, and adjust an operating voltage of each processor core in the voltage domain to the maximum target voltage, so that the operating voltage of the voltage domain can drive a processor core having a greatest performance demand.

In Embodiment 1, the time parameter corresponding to the power limit is adjusted based on the state information of the processing unit, so that not only the time parameter corresponding to the power limit can be flexibly changed with a state of the processing unit, but also the adjusted time parameter can match a current state of the processing unit. In this way, the frequency and voltage of the processing unit are adjusted by using the time parameter that matches the current state, and the adjusted frequency and voltage can also match the current state of the processing unit, thereby effectively improving accuracy of frequency modulation and voltage regulation. Further, the time parameter corresponding to the power limit may be used to represent a time point at which the frequency modulation and voltage regulation are performed on the processing unit. In this manner, the time parameter corresponding to the power limit is adjusted based on the current state of the processing unit, and the time point at which the frequency modulation and voltage regulation are performed on the processing unit may be changed based on the current state of the processing unit. For example, when needing performance, the processing unit may exit an overclocking state at a later time point, or when not needing performance, the processing unit exits an overclocking state at an earlier time point. This helps flexibly limit, based on the state of the processing unit, duration in which the processing unit is in the overclocking state.

The following describes, by using Embodiment 2, how to change a time point of frequency modulation and voltage regulation by adjusting the overclocking weighting factor τ corresponding to the PL 1.

Embodiment 2

Figure 4A:
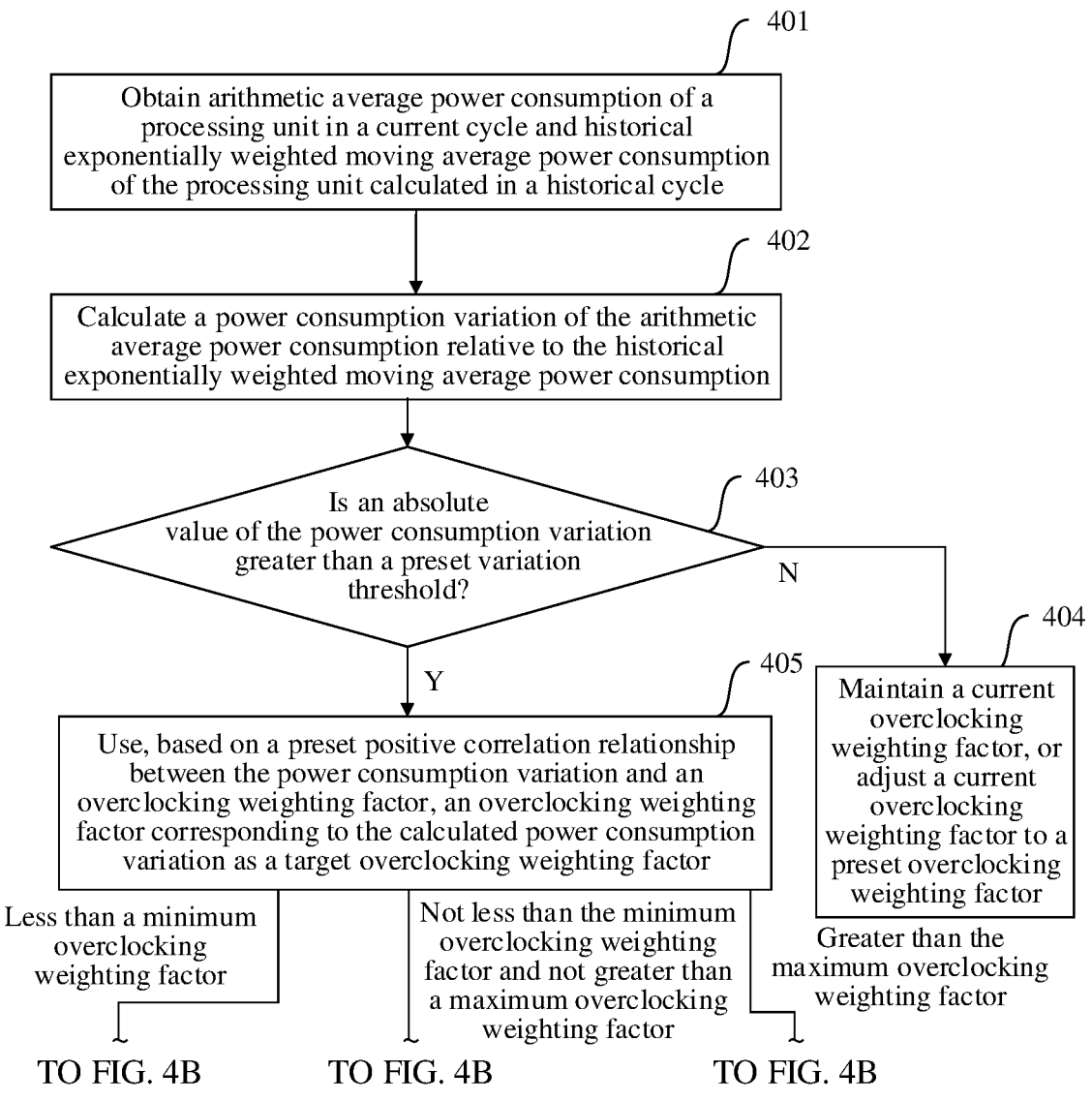

FIG. 4A and FIG. 4B are an example of a schematic flowchart of a power consumption adjustment method according to an embodiment of this application. The method is applicable to a power consumption regulator, for example, the power consumption regulator 14 shown in FIG. 1. In this embodiment of this application, the power consumption regulator may perform the following power consumption adjustment method in a cyclical manner. FIG. 4A and FIG. 4B illustrate an example of a power consumption adjustment process of the power consumption regulator. As shown in FIG. 4A and FIG. 4B, the method includes the following steps.

Step 401: The power consumption regulator obtains arithmetic average power consumption of a processing unit in a current cycle and historical exponentially weighted moving average power consumption of the processing unit calculated in a historical cycle.

For example, still refer to FIG. 1. Assuming that the processing unit is the processor core 10, a power consumption sensor 102 disposed in the processor core 10 may sense power consumption consumed by the processor core in each instantaneous time segment and report the power consumption to the power consumption regulator 14. When determining that the processing unit has run for an adjustment cycle, the power consumption regulator 14 obtains and accumulates the power consumption received in the instantaneous time segments in the current cycle to obtain total power consumption consumed by the processing unit in the current cycle, and divides the total power consumption by a quantity of instantaneous time segments included in the current cycle to obtain the arithmetic average power consumption of the processing unit in the current cycle.

A memory may further store the historical exponentially weighted moving average power consumption (that is, second exponentially weighted moving average power consumption). The historical exponentially weighted moving average power consumption may be stored inside the power consumption regulator 14, or may be stored outside the power consumption regulator 14, for example, stored in an internal memory or an external cache of the memory 100. Assuming that the historical exponentially weighted moving average power consumption is stored inside the power consumption regulator 14, the power consumption regulator 14 may store only one piece of historical exponentially weighted moving average power consumption calculated in a latest historical cycle, or may store a plurality of pieces of historical exponentially weighted moving average power consumption respectively calculated in a plurality of historical cycles. When only one piece of historical exponentially weighted moving average power consumption is stored, the historical exponentially weighted moving average power consumption may be obtained through calculation according to the foregoing formula (1.1) by the power consumption regulator 14 based on arithmetic average power consumption of the processing unit in the latest historical cycle, historical exponentially weighted moving average power consumption calculated in a cycle before the latest historical cycle, and an overclocking weighting factor used in the latest historical cycle, and may be used to represent a power consumption demand of the processing unit in the latest historical cycle. In addition, after the power consumption regulator 14 calculates a new piece of exponentially weighted moving average power consumption each time, the new exponentially weighted moving average power consumption may be used to replace original historical exponentially weighted moving average power consumption. When storing a plurality of pieces of historical exponentially weighted moving average power consumption, after the power consumption regulator 14 calculates a new piece of exponentially weighted moving average power consumption each time, the power consumption regulator 14 may further establish and store a mapping relationship between the exponentially weighted moving average power consumption and a corresponding cycle. When one of the pieces of historical exponentially weighted moving average power consumption needs to be used, the power consumption regulator 14 finds a latest cycle from the corresponding cycles in the stored plurality of mapping relationships, and obtains exponentially weighted moving average power consumption corresponding to the latest cycle.

Step 402: The power consumption regulator calculates a power consumption variation of the arithmetic average power consumption of the processing unit in the current cycle relative to the historical exponentially weighted moving average power consumption of the processing unit calculated in the historical cycle.

In step 402, assuming that the arithmetic average power consumption of the processing unit in the current cycle is $P_1$, and the historical exponentially weighted moving average power consumption of the processing unit calculated in the historical cycle is $P_{EWMA_0}$, a power consumption variation $\Delta P$ may be represented by the following formula (4.1):

$$\Delta P = P_1 - P_{EWMA_0} \qquad (4.1)$$

Step 403: The power consumption regulator determines whether an absolute value of the power consumption variation is greater than a preset variation threshold, and if no, performs step 404, or if yes, performs step 405.

In step 403, the preset variation threshold may be used to represent whether there is an obvious (or unignorable) power consumption change. When the power consumption variation $\Delta P$ is less than or equal to the preset variation threshold, it means that the power consumption consumed by the processing unit in the current cycle is basically equivalent to the power consumption consumed by the processing unit in a historical cycle before the current cycle. In this case, although a power consumption change of the processing unit occurs in the current cycle, the power consumption change is slight and may be ignored. Conversely, when the power consumption variation $\Delta P$ is greater than the preset variation threshold, it means that the power consumption consumed by the processing unit in the current cycle is significantly different from the power consumption consumed by the processing unit in the historical cycle before the current cycle. A phenomenon that the power consumption of the processing unit increases sharply or decreases sharply occurs in the current cycle. The power consumption change is obvious and needs to be considered as a factor for frequency modulation and voltage regulation.

For example, considering that in a current scenario, an overclocking weight factor τ corresponding to a PL 1 is adjusted, and the PL 1 is generally set to a TDP, the preset variation threshold may be further set to a value in direct proportion to the TDP, for example, 0.015×TDP. In this way, even if the TDPs in different processors are set differently, interference caused by different TDP orders can be reduced by using positive correlation relationships with the TDPs. This not only helps improve accuracy of filtering a slight power consumption change, but also is applicable to processors in various scenarios. For example, assuming that a TDP in a processor is set to 30 W in a scenario, and the TDP in the processor is set to 100 W in another scenario. Although it is appropriate to set a preset variation threshold of 1.5 W in the scenario with 100 W, the preset variation threshold of 1.5 W cannot be well applicable to the scenario with 30 W, because a power variation of 1.5 W is already considered as a large power consumption fluctuation in the scenario with 30 W rather than a small power consumption fluctuation. In this case, the positive correlation relationship of 0.015 TDP is set, so that the preset variation threshold set in the scenario with 30 W is 0.45 W, and the preset variation threshold set in the scenario with 100 W is 1.5 W. The preset variation thresholds in both scenarios are appropriate, and a small power fluctuation occurring in each scenario can be accurately filtered.

It should be understood that if adjustment is performed for a time cycle T2 corresponding to a PL 2, considering that the PL 2 is generally set to 125%×TDP, the preset variation threshold may be set to a value in direct proportion to 125%×TDP, for example, 0.015×125%×TDP, to set, at a power consumption level of the PL 2, a power consumption jitter amplitude that can be withstood at the power consumption level of the PL 2. Alternatively, if the adjustment is performed for a time cycle corresponding to a PL 3 or a PL 4, the preset variation threshold may alternatively be set based on a positive correlation relationship with the PL 3 or the PL 4, for example, set to 0.015×PL 3 in a PL 3 scenario, and set to 0.015×PL 4 in a PL 4 scenario.

Certainly, in the foregoing example, the preset variation threshold is set based on a positive correlation relationship with the PL. This is only an optional implementation. In another optional implementation, the preset variation threshold may alternatively be a fixed value set by a person skilled in the art based on experience. This is not specifically limited.

Step 404: The power consumption regulator maintains a current overclocking weighting factor, or adjusts a current overclocking weighting factor to a preset overclocking weighting factor.

In the foregoing step 403 and step 404, when the power consumption change is very slight, it indicates that neither a sharp increase of power consumption nor a sharp decrease of power consumption occurs in the processing unit, and a service is stably processed based on power consumption that is basically unchanged. In this case, because the power consumption consumed by the processing unit in the current cycle is basically the same as the power consumption consumed by the processing unit in the historical cycle, regardless of how a value of the overclocking weighting factor changes, it is equivalent to that weights are allocated to two pieces of power consumption that are basically the same, and calculated exponentially weighted moving average power consumption is also basically the same. In this case, the value of the overclocking weighting factor basically does not affect a magnitude of the exponentially weighted moving average power consumption. Therefore, the power consumption regulator may adjust the overclocking weighting factor randomly or according to a specific rule. For example, the current overclocking weighting factor may be directly maintained without being adjusted. In this way, even if the power consumption in the current scenario frequently jitters, the power consumption regulator does not repeatedly adjust the overclocking weighting factor frequently. This can effectively save computing resources in the power consumption regulator. For another example, the overclocking weighting factor may be adjusted to a fixed preset overclocking weighting factor, so that the processing unit can use a unified overclocking weighting factor each time in a stable power consumption state. This effectively improves flexible management of power consumption adjustment in the stable state.

Step 405: The power consumption regulator uses, based on a preset positive correlation relationship between the power consumption variation and the overclocking weighting factor, an overclocking weighting factor corresponding to the calculated power consumption variation as a target overclocking weighting factor.

When the target overclocking weighting factor is less than a minimum overclocking weighting factor, step 406 is performed.

When the target overclocking weighting factor is not less than the minimum overclocking weighting factor and is not greater than a maximum overclocking weighting factor, step 407 is performed.

When the target overclocking weighting factor is greater than the maximum overclocking weighting factor, step 408 is performed.

In step 405, there is a preset positive correlation relationship between the power consumption variation and the overclocking weighting factor. In other words, a larger power consumption variation indicates a larger overclocking weighting factor, and a smaller power consumption variation indicates a smaller overclocking weighting factor. The preset positive correlation relationship between the power consumption variation and the overclocking weighting factor may be set by a person skilled in the art based on experience, or may be obtained through experimental verification. This is not specifically limited.

For example, the following formula (4.2) shows a positive correlation relationship expression obtained through experimental verification:

$$\tau = \frac{(\Delta P + y \times TDP) \times (\tau_{max} - \tau_{min})}{z \times TDP} + \tau_{min} \qquad (4.2)$$

In the foregoing formula (4.2), $\tau$ is an overclocking weighting factor, $\Delta P$ is a power consumption variation, and y and z are fixed coefficients obtained through the experimental verification. Preferably, y may be set to 0.15, and z may be set to 0.3. $\tau_{max}$ is a preset upper limit value of the overclocking weighting factor $\tau$, and may be generally set to 10 s. $\tau_{min}$ is a preset lower limit value of the overclocking weighting factor $\tau$, and may be generally set to 0.1 s. The TDP is thermal design power.

Based on the positive correlation relationship shown in the foregoing formula (4.2) and a calculation manner of the exponentially weighted moving average power consumption shown in the foregoing formula (1.1), the following describes in detail how a value change of the overclocking weighting factor affects a time point of the frequency modulation and voltage regulation.

When the calculated power consumption variation $\Delta P$ is greater than 0, a phenomenon of a sharp increase of the power consumption occurs in the processing unit. In other words, the arithmetic average power consumption $P_1$ in the current cycle is much greater than the historical exponentially weighted moving average power consumption $P_{EWMA_0}$. In this case, a larger sharp increase of the power consumption (that is, larger $\Delta P$) indicates a larger target overclocking weighting factor $\tau$ calculated by substituting $\Delta P$ into the foregoing formula (4.2). After the target overclocking weighting factor $\tau$ is substituted into the foregoing formula (1.1), it is found that a weight occupied by the arithmetic average power consumption $P_1$ in the current cycle decreases, and a weight occupied by the historical exponentially weighted moving average power consumption $P_{EWMA_0}$ increases. In this way, exponentially weighted moving average power consumption $P_{EWMA_1}$ obtained by weighting the power consumption $P_1$ in the current cycle and the historical exponentially weighted moving average power consumption $P_{EWMA_0}$ based on the larger target overclocking weighting factor becomes smaller, and $P_{EWMA_1}$ is less likely to be greater than the PL 1. In other words, it is less likely to trigger a PL 1 threshold and cause the processing unit to exit the overclocking state. It can be learned that in a case in which the power consumption increases, the overclocking weighting factor $\tau$ is correspondingly increased as the power consumption variation $\Delta P$ increases, so that when needing performance, the processing unit may delay exiting the overclocking state of the PL 1.

When the calculated power consumption variation $\Delta P$ is less than 0, a phenomenon of a sharp decrease of the power consumption occurs in the processing unit. In other words, the arithmetic average power consumption $P_1$ in the current cycle is much smaller than the historical exponentially weighted moving average power consumption $P_{EWMA_0}$. In this case, a larger sharp decrease of the power consumption (that is, smaller $\Delta P$) indicates a smaller target overclocking weighting factor $\tau$ calculated by substituting $\Delta P$ into the foregoing formula (4.2). After the target overclocking weighting factor $\tau$ is substituted into the foregoing formula (1.1), it is found that a weight occupied by the arithmetic average power consumption $P_1$ in the current cycle becomes larger, and a weight occupied by the historical exponentially weighted moving average power consumption $P_{EWMA_0}$ becomes smaller. In this way, the exponentially weighted moving average power consumption $P_{EWMA_1}$ obtained by weighting the power consumption $P_1$ in the current cycle and the historical exponentially weighted moving average power consumption $P_{EWMA_0}$ based on the smaller target overclocking weighting factor becomes smaller, so that $P_{EWMA_1}$ is more likely to be lowered to critical power for entering the overclocking state of the PL 1. In other words, the processing unit is more likely to exit the overclocking state of the PL 1. It can be learned that in a case in which the power consumption is decreased, the overclocking weighting factor $\tau$ is correspondingly decreased as the power consumption variation $\Delta P$ decreases. This helps the processing unit to exit the overclocking state of the PL 1 in advance when not needing performance.

Further, for example, in the foregoing step 404, assuming that when the absolute value of the power consumption variation $\Delta P$ is less than the preset variation threshold, the overclocking weighting factor $\tau$ needs to be adjusted to a fixed preset overclocking weighting factor, and the fixed preset overclocking weighting factor may also be calculated by using the foregoing formula (4.2). For example, when it is determined that the absolute value of the power consumption variation $\Delta P$ is very small, the power consumption regulator may further directly update the power consumption variation $\Delta P$ to 0, and substitute the updated power consumption variation $\Delta P$ into the foregoing formula (4.2). In this way, because y and z in the foregoing formula (4.2) are fixed values obtained through experimental verification, and $\tau_{max}$ and $\tau_{min}$ are preset fixed values, provided that the TDP remains unchanged, the target overclocking weighting factor $\tau$ calculated by updating $\Delta P$ to o each time and then substituting $\Delta P$ into the foregoing formula (4.2) is a fixed value. In this way, in this example, a same formula can be used to calculate target overclocking weighting factors in a scenario in which power consumption changes greatly and in a scenario in which power consumption changes slightly, and no other logic needs to be additionally set for the scenario in which the power consumption changes slightly. This helps reduce a design process and facilitate implementation.

Step 406: The power consumption regulator adjusts the current overclocking weighting factor to the minimum overclocking weighting factor, and then performs step 409.

In the foregoing step 405 and step 406, the minimum overclocking weighting factor may be $\tau_{min}$ in the foregoing formula (4.2), and is used to represent maximum duration for exiting the overclocking state of the PL 1 in advance. When the target overclocking weighting factor calculated according to the foregoing formula (4.2) is less than the minimum overclocking weighting factor, it means that the power consumption of the processing unit decreases sharply. As a result, a time point matched with the decreased ultra-low power consumption may be a time point at which the processing unit immediately exits the overclocking state, but that the processing unit immediately exits the overclocking state is definitely not conducive to a stable state of the processing unit. Therefore, the current overclocking factor is set to the minimum overclocking weighting factor that can ensure stability of the processing unit, and is not directly set to the target overclocking weighting factor that cannot ensure the stability of the processing unit, so that a period of time can be reserved to complete transition from the overclocking state to a non-overclocking state. This improves stability of exiting the overclocking state.

Step 407: The power consumption regulator adjusts the current overclocking weighting factor to the target overclocking weighting factor, and then performs step 409.

In step 407, after the target overclocking weighting factor is calculated based on the positive correlation relationship between the power consumption variation and the overclocking weighting factor, if the target overclocking weighting factor is between the preset minimum overclocking weighting factor and the preset maximum overclocking weighting factor, it indicates that the target overclocking weighting factor is available. In this case, the current overclocking weighting factor is adjusted to the target weighting factor, so that the processing unit can delay exiting the overclocking state when needing performance, and exit the overclocking state in advance when not needing performance. This helps implement a dual effect of improving overclocking performance and reducing power consumption.

Step 408: The power consumption regulator adjusts the current overclocking weighting factor to the maximum overclocking weighting factor, and then performs step 409.

In the foregoing step 405 and step 408, the maximum overclocking weighting factor may be $\tau_{max}$ in the foregoing formula (4.2), and is used to represent maximum duration for delaying exiting the overclocking state of the PL 1. When the target overclocking weighting factor calculated according to the foregoing formula (4.2) is greater than the maximum overclocking weighting factor, it means that the power consumption of the processing unit increases sharply. As a result, a time point matched with the increased ultra-high power consumption may be a time point at which the processing unit does not exit the overclocking state for a long time. However, if the processing unit does not exit the overclocking state for a long time, a temperature of the processing unit inevitably increases. This is not conducive to service life and reliability of the processing unit. Therefore, the current overclocking factor is set to the maximum overclocking weighting factor that can be within a safe temperature range, and is not directly set to the target overclocking weighting factor that exceeds the safe temperature range, so that the processing unit can exit the overclocking state before the processing unit is about to exceed the safe temperature range. This improves overclocking processing performance while ensuring the reliability of the processing unit.

Step 409: The power consumption regulator weighs, based on weight allocation indicated by an adjusted overclocking weighting factor, average power consumption of the processing unit in the current cycle, and the historical exponentially weighted moving average power consumption of the processing unit calculated in the historical cycle, to obtain current exponentially weighted moving average power consumption (that is, first exponentially weighted moving average power consumption).

Step 410: The power consumption regulator determines whether the current exponentially weighted average power consumption is greater than the PL 1, and if yes, performs step 411, or if no, performs step 412.

Step 411: The power consumption regulator decreases a frequency and a voltage of the processing unit.

Step 412: The power consumption regulator maintains the frequency and the voltage of the processing unit.

For example, the power consumption regulator may set a same adjustment cycle for the overclocking weighting factor and the frequency modulation and voltage regulation. In this way, after obtaining arithmetic average power consumption and historical exponentially weighted moving average power consumption in one adjustment cycle each time, the power consumption regulator first adjusts the overclocking weighting factor based on the two pieces of average power consumption, and then determines, based on the steps in step 409 to step 412 and by using the adjusted overclocking weighting factor and the two pieces of average power consumptions, whether to perform the frequency modulation and voltage regulation. Alternatively, the power consumption regulator may respectively set an independent adjustment cycle for the overclocking weighting factor and the frequency modulation and voltage regulation. In this way, after obtaining arithmetic average power consumption and historical exponentially weighted moving average power consumption in an adjustment cycle of the overclocking weighting factor each time, the power consumption regulator may first adjust the overclocking weighting factor based on the two pieces of average power consumption, and after obtaining the arithmetic average power consumption and the historical exponentially weighted moving average power consumption in a frequency modulation and voltage regulation cycle, the power consumption regulator determines, by using the adjusted overclocking weighting factor and the two pieces of average power consumption corresponding to the frequency modulation and voltage regulation cycle, whether to perform the frequency modulation and voltage regulation. Certainly, in a case in which the same adjustment cycle is set for the overclocking weighting factor and the frequency modulation and voltage regulation, after obtaining the arithmetic average power consumption and the historical exponentially weighted moving average power consumption in the adjustment cycle each time, the power consumption regulator may alternatively first use the current overclocking weighting factor and the two pieces of average power consumption to determine whether to perform the frequency modulation and voltage regulation, and then use the two pieces of average power consumption to adjust the overclocking weighting factor. In this case, the adjusted overclocking weighting factor is used for a next adjustment cycle.

In Embodiment 2, the overclocking weighting factor corresponding to the PL 1 is dynamically adjusted based on the power consumption variation of the processing unit, and this helps dynamically change, based on an actual power consumption demand of the processing unit, weight allocation of the current power consumption and the historical power consumption when the exponentially weighted moving average power consumption is calculated, and flexibly change a time point at which the processing unit exits the overclocking state, to limit duration in which the processor is in the overclocking state. In addition, the overclocking weighting factor is adjusted based on the positive correlation between the power consumption variation and the overclocking weighting factor, so that the processing unit can further delay exiting the overclocking state when needing performance, to improve an overclocking capability of the processing unit, and exit the overclocking state in advance when not needing the performance, to accumulate more power consumption budgets. This implements a dual effect of improving the overclocking capability and saving the power consumption.

It should be understood that, in Embodiment 2, how to change the time point of the frequency modulation and voltage regulation is described by using only an example in which the overclocking weighting factor $\tau$ corresponding to the PL 1 is adjusted. For a related solution in which the time point of the frequency modulation and voltage regulation is changed by adjusting a time cycle T corresponding to any one of the PL 2 to the PL 4, refer to Embodiment 2. For example, the PL 2 is used as an example to briefly describe a possible example of dynamically adjusting a time cycle T2 corresponding to the PL 2.

In this example, if an absolute value of a power consumption variation $\Delta P$ of a current cycle relative to a previous cycle is very small, it indicates that power consumption consumed by the processing unit in the current cycle is basically the same as power consumption consumed by the processing unit in a historical cycle, and there is a high probability that power consumption of the processing unit in a next cycle does not suddenly change. Therefore, regardless of how a value of a time cycle changes, arithmetic average power consumption obtained by the power consumption regulator in the time cycle basically does not change. Based on this, the power consumption regulator may keep the current time cycle T2, to avoid repeated adjustment in a scenario in which the power consumption frequently jitters, and save computing resources. Certainly, the time cycle T2 may alternatively be adjusted to a preset time cycle, so that power consumption adjustment is performed by using a same time cycle each time when a power consumption state is stable, thereby improving centralized management.

Correspondingly, if the power consumption variation $\Delta P$ of the current cycle relative to the previous cycle is a positive value and is very large, it indicates that the power consumption consumed by the processing unit in the current cycle is significantly greater than the power consumption consumed by the processing unit in the historical cycle, and there is a high probability that the processing unit needs large power consumption in a next cycle. Therefore, the power consumption regulator may prolong the time cycle T2 corresponding to the PL 2. In this way, refer to the foregoing formula (1.2), it can be learned that when the time cycle T2 becomes longer, the power consumption regulator calculates the arithmetic average power consumption by using power consumption in more instantaneous time segments, that is, considering more historical power consumption. However, in a scenario in which performance is needed, the historical power consumption is less than the current power consumption. Therefore, the arithmetic average power consumption $P_1$ of the historical power consumption and the current power consumption becomes smaller and is less likely to be greater than the PL 2. This helps reduce a probability of exiting the overclocking state of the PL 2 and provide high performance needed by the processing unit in the next cycle.

Conversely, if the power consumption variation $\Delta P$ of the current cycle relative to the previous cycle is a negative value and an absolute value is very large, it indicates that the power consumption consumed by the processing unit in the current cycle is significantly less than the power consumption consumed by the processing unit in the historical cycle, and there is a high probability that the processing unit needs small power consumption in a next cycle. Therefore, the power consumption regulator may shorten the time cycle T2 corresponding to the PL 2. In this way, refer to the foregoing formula (1.2), it can be learned that when the time cycle T2 shortens, the power consumption regulator calculates the arithmetic average power consumption by using power consumption in fewer instantaneous time segments, that is, considering less historical power consumption. However, in a scenario in which performance is not needed, the historical power consumption is greater than the current power consumption. Therefore, the arithmetic average power consumption $P_1$ of the historical power consumption and the current power consumption becomes smaller, and is more likely to be lowered to critical power for entering the overclocking state of the PL 2, that is, more likely to exit the overclocking state of the PL 2. In this way, power headroom can be accumulated for a next overclocking operation.

It should be understood that the foregoing example is merely a possible example of adjusting the time cycle corresponding to the PL 2 to the PL 4, but this is not limited to that the time cycle needs to be adjusted in this manner. Any technical solution that can achieve a same technical effect as that in Embodiment 2 by adjusting the time cycle corresponding to the PL 2 to the PL 4 falls within the protection scope of this application. This is not limited in this application.

According to the foregoing method, FIG. 5 is a schematic structural diagram of a power consumption regulator 500 according to an embodiment of this application. The power consumption regulator 500 may be a chip or a circuit, for example, a chip or a circuit that may be disposed in a processor. The power consumption regulator 500 may correspond to the power consumption regulator 14 in the foregoing method. The power consumption regulator 500 may implement steps of any one or more corresponding methods shown in FIG. 3 or FIG. 4A and FIG. 4B. As shown in FIG. 5, the power consumption regulator 500 may include a communication interface 501 and a processing circuit 502. The power consumption regulator 500 may further include a bus system, and the communication interface 501 and the processing circuit 502 may be connected through the bus system. In addition, the communication interface 501 may be further connected to a temperature sensor and/or a power consumption sensor of each processor core through the bus system, and the processing circuit 502 may be further connected to a frequency modulation executor of each processor core and a voltage regulation executor in each voltage domain through the bus system.

In embodiments of this application, the communication interface 501 may obtain state information of a processing unit in a processor by communicating and interacting with the temperature sensor and/or the power consumption sensor disposed in each processor core. Correspondingly, the processing circuit 502 may adjust, based on the state information of the processing unit, a time parameter corresponding to a power limit, determine power consumption of the processing unit based on an adjusted time parameter, and send instruction messages to the corresponding frequency modulation executor and voltage regulation executor based on the power consumption and the power limit of the processing unit, to adjust a frequency and a voltage of the processing unit.

For concepts, explanations, detailed descriptions, and other steps that are related to the power consumption regulator 500 and that are related to the technical solutions provided in embodiments of this application, refer to descriptions about the content in the foregoing method or other embodiments. Details are not described herein again.

Figure 6:
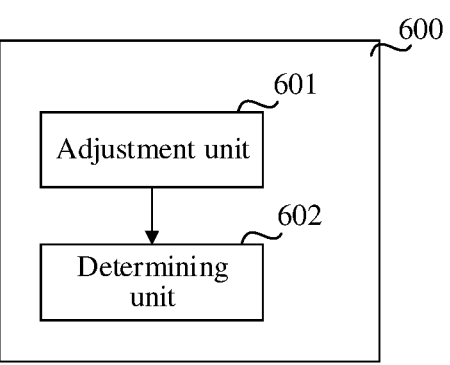
FIG. 6 is an example of a schematic structural diagram of another power consumption regulator according to an embodiment of this application.

According to the foregoing method, FIG. 6 is a schematic structural diagram of another power consumption regulator 600 according to an embodiment of this application. The power consumption regulator 600 may be a chip or a circuit, for example, a chip or a circuit that may be disposed in a processor. The power consumption regulator 600 may correspond to the power consumption regulator 14 in the foregoing method. The power consumption regulator 600 may implement steps of any one or more corresponding methods shown in FIG. 3 or FIG. 4A and FIG. 4B. As shown in FIG. 6, the power consumption regulator 600 may include an adjustment unit 601 and a determining unit 602.

In embodiments of this application, the adjustment unit 601 may adjust, based on state information of a processing unit, a time parameter corresponding to a power limit, and the determining unit 602 may determine power consumption of the processing unit based on an adjusted time parameter, so that the adjustment unit 601 may adjust a frequency and a voltage of the processing unit based on the power consumption and the power limit of the processing unit.

For concepts, explanations, detailed descriptions, and other steps that are related to the power consumption regulator 600 and that are related to the technical solutions provided in embodiments of this application, refer to descriptions about the content in the foregoing method or other embodiments. Details are not described herein again.

It may be understood that for a function of each unit in the power consumption regulator 600, refer to implementation of corresponding method embodiments, and details are not described herein again.

It should be understood that the division of the units of the power consumption regulator 600 is merely logical function division, and in actual implementation, all or some of the units may be integrated into one physical entity, or may be physically separated. In embodiments of this application, both the adjustment unit 601 and the determining unit 602 may be implemented by the processing circuit 502 in FIG. 5.

According to the method provided in embodiments of this application, this application further provides a computer program product. The computer program product includes computer program code. When the computer program code is run on a computer, the computer is enabled to perform the method in any one of the embodiments shown in FIG. 3 or FIG. 4A and FIG. 4B.

According to the method provided in embodiments of this application, this application further provides a computer-readable storage medium. The computer-readable storage medium stores program code. When the program code is run on a computer, the computer is enabled to perform the method in any one of the embodiments shown in FIG. 3 or FIG. 4A and FIG. 4B.

According to the method provided in embodiments of this application, this application further provides an electronic device. The electronic device includes a processor, and the processor is coupled to a memory. The processor is configured to execute a computer program stored in the memory, so that the electronic device performs the method in any one of the embodiments shown in FIG. 3 to FIG. 5.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that are run on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems via the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   adjusting, based on state information of a processing unit, a time parameter corresponding to a power limit, to obtain an adjusted time parameter, wherein the time parameter comprises an overclocking time parameter, and the adjusted time parameter comprises an adjusted overclocking time parameter;
   determining power consumption of the processing unit based on the adjusted time parameter; and
   adjusting a frequency and a voltage of the processing unit based on the power consumption and the power limit of the processing unit; and
   wherein determining the power consumption of the processing unit based on the adjusted time parameter comprises:
      weighting current power consumption of the processing unit and historical power consumption of the processing unit based on a weight allocation of the current power consumption of the processing unit and the historical power consumption of the processing unit, to obtain first exponentially weighted moving average power consumption of the processing unit, wherein the weight allocation of the current power consumption and the historical power consumption are indicated by the adjusted overclocking time parameter.

2. The method according to claim 1, wherein adjusting, based on the state information of the processing unit, the time parameter corresponding to the power limit, to obtain the adjusted time parameter, comprises:
   adjusting the time parameter based on a power consumption fluctuation degree of the processing unit, wherein a difference between the adjusted time parameter and the time parameter before the adjustment is in direct proportion to the power consumption fluctuation degree.

3. The method according to claim 2, wherein before adjusting the time parameter based on the power consumption fluctuation degree of the processing unit, the method further comprises:

determining that the power consumption fluctuation degree is greater than a preset fluctuation degree threshold.

4. The method according to claim 2, wherein adjusting the time parameter based on the power consumption fluctuation degree of the processing unit comprises:
   obtaining second exponentially weighted moving average power consumption of the processing unit under the time parameter before the adjustment; and
   performing at least one of:
      increasing the time parameter in response to the current power consumption of the processing unit being greater than the second exponentially weighted moving average power consumption; or
      decreasing the time parameter in response to the current power consumption of the processing unit being less than the second exponentially weighted moving average power consumption.

5. The method according to claim 4, wherein increasing the time parameter or decreasing the time parameter comprises:
   calculating a power consumption variation of the current power consumption of the processing unit relative to the second exponentially weighted moving average power consumption;
   using, based on a preset positive correlation relationship between the power consumption variation and the time parameter, a time parameter corresponding to the calculated power consumption variation as a target time parameter;
   adjusting the time parameter to the target time parameter in response to the target time parameter is not less than a minimum time parameter and is not greater than a maximum time parameter;
   adjusting the time parameter to the maximum time parameter in response to the target time parameter is greater than the maximum time parameter; and
   adjusting the time parameter to the minimum time parameter in response to the target time parameter is less than the minimum time parameter.

6. The method according to claim 1, wherein adjusting the frequency and the voltage of the processing unit based on the power consumption and the power limit of the processing unit comprises:
   decreasing the frequency and the voltage of the processing unit in response to the power consumption of the processing unit being greater than the power limit; or
   maintaining the frequency and the voltage of the processing unit in response to the power consumption of the processing unit being not greater than the power limit.

7. A processor, comprising:
   a processing unit; and
   a power consumption regulator connected to the processing unit,
   wherein the power consumption regulator is configured to:
      adjust, based on state information of the processing unit, a time parameter corresponding to a power limit, to obtain an adjusted time parameter, wherein the time parameter comprises an overclocking time parameter, and the adjusted time parameter comprises an adjusted overclocking time parameter;
      determine power consumption of the processing unit based on the adjusted time parameter; and
      adjust a frequency and a voltage of the processing unit based on the power consumption and the power limit of the processing unit; and wherein determining the power consumption of the processing unit based on the adjusted time parameter comprises:

weighting current power consumption of the processing unit and historical power consumption of the processing unit based on a weight allocation of the current power consumption of the processing unit and the historical power consumption of the processing unit, to obtain first exponentially weighted moving average power consumption of the processing unit, wherein the weight allocation of the current power consumption and the historical power consumption are indicated by the adjusted overclocking time parameter.

8. The processor according to claim 7, further comprising a power consumption sensor connected to the processing unit, wherein the power consumption sensor is further connected to the power consumption regulator, and the power consumption sensor is configured to:

sense current power consumption of the processing unit; and send the current power consumption to the power consumption regulator.

9. The processor according to claim 8, wherein the power consumption regulator is further configured to:

adjust the time parameter based on a power consumption fluctuation degree of the processing unit, wherein a difference between the adjusted time parameter and the time parameter before the adjustment is in direct proportion to the power consumption fluctuation degree.

10. The processor according to claim 9, wherein before adjusting the time parameter based on the power consumption fluctuation degree of the processing unit, the power consumption regulator is further configured to:

determine that the power consumption fluctuation degree is greater than a preset fluctuation degree threshold.

11. The processor according to claim 9, wherein the power consumption regulator is further configured to:

obtain second exponentially weighted moving average power consumption of the processing unit under the time parameter before the adjustment; and perform at least one of:

increase the time parameter in response to the current power consumption of the processing unit being greater than the second exponentially weighted moving average power consumption; or decrease the time parameter in response to the current power consumption of the processing unit being less than the second exponentially weighted moving average power consumption.

12. The processor according to claim 11, wherein the power consumption regulator is specifically configured to:

calculate a power consumption variation of the current power consumption of the processing unit relative to the second exponentially weighted moving average power consumption;

use, based on a preset positive correlation relationship between the power consumption variation and the time parameter, a time parameter corresponding to the calculated power consumption variation as a target time parameter;

adjust the time parameter to the target time parameter in response to the target time parameter is not less than a minimum time parameter and is not greater than a maximum time parameter;

adjust the time parameter to the maximum time parameter in response to the target time parameter is greater than the maximum time parameter; and adjust the time parameter to the minimum time parameter in response to the target time parameter is less than the minimum time parameter.

13. The processor according to claim 7, wherein the power consumption regulator is further configured to:

decrease the frequency and the voltage of the processing unit in response to the power consumption of the processing unit being greater than the power limit; or maintain the frequency and the voltage of the processing unit in response to the power consumption of the processing unit being not greater than the power limit.

14. The processor according to claim 13, further comprising a frequency modulation executor and a voltage regulation executor that are connected to the processing unit, wherein the frequency modulation executor and the voltage regulation executor are further connected to the power consumption regulator, wherein the power consumption regulator is further configured to:

send, when the frequency and the voltage of the processing unit need to be decreased, a frequency modulation instruction to the frequency modulation executor; and send a voltage regulation instruction to the voltage regulation executor, wherein the frequency modulation executor is configured to:

decrease the frequency of the processing unit based on the frequency modulation instruction, and wherein the voltage regulation executor is configured to:

decrease the voltage of the processing unit based on the voltage regulation instruction.

15. An electronic device, comprising at least one processor, wherein the at least one processor is coupled to at least one memory, and the at least one processor is configured to execute at least one computer program stored in the at least one memory, that causes the electronic device to:

adjust, based on state information of a processing unit, a time parameter corresponding to a power limit, to obtain an adjusted time parameter, wherein the time parameter comprises an overclocking time parameter, and the adjusted time parameter comprises an adjusted overclocking time parameter;

determine power consumption of the processing unit based on the adjusted time parameter; and adjust a frequency and a voltage of the processing unit based on the power consumption and the power limit of the processing unit; and wherein determining the power consumption of the processing unit based on the adjusted time parameter comprises:

weighting current power consumption of the processing unit and historical power consumption of the processing unit based on a weight allocation of the current power consumption of the processing unit and the historical power consumption of the processing unit, to obtain first exponentially weighted moving average power consumption of the processing unit, wherein the weight allocation of the current power consumption and the historical power consumption are indicated by the adjusted overclocking time parameter.

16. The electronic device according to claim 15, wherein adjusting, based on the state information of the processing unit, the time parameter corresponding to the power limit, to obtain the adjusted time parameter, comprises:

adjusting the time parameter based on a power consumption fluctuation degree of the processing unit, wherein a difference between the adjusted time parameter and the time parameter before the adjustment is in direct proportion to the power consumption fluctuation degree.

17. The electronic device according to claim 16, wherein the at least one processor is configured to execute the at least one computer program stored in the at least one memory, that causes the electronic device further to:

before adjusting the time parameter based on the power consumption fluctuation degree of the processing unit, determining that the power consumption fluctuation degree is greater than a preset fluctuation degree threshold.

18. The electronic device according to claim 16, wherein adjusting the time parameter based on the power consumption fluctuation degree of the processing unit comprises:

obtaining second exponentially weighted moving average power consumption of the processing unit under the time parameter before the adjustment; and performing at least one of:

increasing the time parameter in response to the current power consumption of the processing unit being greater than the second exponentially weighted moving average power consumption; or decreasing the time parameter in response to the current power consumption of the processing unit being less than the second exponentially weighted moving average power consumption.

19. The electronic device according to claim 18, wherein increasing the time parameter or decreasing the time parameter comprises:

calculating a power consumption variation of the current power consumption of the processing unit relative to the second exponentially weighted moving average power consumption;

using, based on a preset positive correlation relationship between the power consumption variation and the time parameter, a time parameter corresponding to the calculated power consumption variation as a target time parameter;

adjusting the time parameter to the target time parameter in response to the target time parameter is not less than a minimum time parameter and is not greater than a maximum time parameter;

adjusting the time parameter to the maximum time parameter in response to the target time parameter is greater than the maximum time parameter; and adjusting the time parameter to the minimum time parameter in response to the target time parameter is less than the minimum time parameter.

20. The electronic device according to claim 15, wherein adjusting the frequency and the voltage of the processing unit based on the power consumption and the power limit of the processing unit comprises:

decreasing the frequency and the voltage of the processing unit in response to the power consumption of the processing unit being greater than the power limit; or maintaining the frequency and the voltage of the processing unit in response to the power consumption of the processing unit being not greater than the power limit.

* * * * *